(12) United States Patent
Grant et al.

(10) Patent No.: US 7,024,983 B2
(45) Date of Patent: Apr. 11, 2006

(54) BREWING APPARATUS HOT WATER CONTROL

(75) Inventors: Anthony B. Grant, Weston, FL (US); Zakary E. Hartman, Coral Springs, FL (US); Richard J. Rogissart, Miami Lakes, FL (US); James A. Tebo, Jr., Naples, FL (US)

(73) Assignee: HP Intellectual Corp., Wilmington, DE (US)

( * ) Notice: Subject to any disclaimer, the term of this patent is extended or adjusted under 35 U.S.C. 154(b) by 62 days.

(21) Appl. No.: 10/683,146

(22) Filed: Oct. 10, 2003

(65) Prior Publication Data

US 2005/0076787 A1   Apr. 14, 2005

(51) Int. Cl.
*A47J 31/00* (2006.01)

(52) U.S. Cl. .............................. 99/281; 99/280; 99/295; 99/289 R

(58) Field of Classification Search ................ 99/280, 99/281, 282, 283, 295, 289 R
See application file for complete search history.

(56) References Cited

U.S. PATENT DOCUMENTS

| | | | |
|---|---|---|---|
| 2,882,811 A | 4/1959 | Kass ............................ 99/312 |
| 2,899,886 A | 4/1959 | Rodth ........................... 99/295 |
| 3,030,874 A | 4/1962 | Fiori ............................ 99/287 |
| 3,374,897 A | 3/1968 | Martin ........................ 210/455 |
| 3,450,024 A | 6/1969 | Martin .......................... 99/295 |
| 3,490,356 A | 1/1970 | Peterson et al. .............. 99/300 |
| 3,561,349 A | 2/1971 | Endo et al. ................... 99/307 |
| 3,610,132 A | 10/1971 | Martin et al. ................. 99/295 |
| 3,626,839 A | 12/1971 | Martin et al. ................. 99/315 |
| 3,793,935 A | 2/1974 | Martin .......................... 99/295 |
| 3,861,285 A | 1/1975 | Martin .......................... 99/295 |
| 3,924,525 A | 12/1975 | Vitous .......................... 99/303 |
| 3,935,805 A | 2/1976 | Ihlenfeld ...................... 99/300 |
| 3,952,642 A | 4/1976 | Vitous .......................... 99/300 |
| 3,975,996 A | 8/1976 | Vitous .......................... 99/295 |
| 4,080,299 A | 3/1978 | Bartolome .................. 210/479 |
| 4,174,006 A | 11/1979 | Panneman .................... 141/87 |
| 4,300,442 A | 11/1981 | Martin ..................... 99/289 R |
| 4,303,525 A | 12/1981 | Stover ........................ 210/455 |
| 4,429,623 A | 2/1984 | Illy ............................... 99/295 |
| 4,550,024 A | 10/1985 | Le Granse ................... 426/77 |
| 4,612,850 A | 9/1986 | Kanazashi et al. ........ 99/289 R |
| 4,642,190 A | 2/1987 | Zimmerman ................ 210/464 |
| 4,667,585 A | 5/1987 | Harashima et al. ....... 99/289 R |
| 4,782,744 A | 11/1988 | Bunn ........................... 99/307 |
| 4,791,860 A | 12/1988 | Verheijen ................... 99/323.3 |
| 4,825,758 A | 5/1989 | Snowball et al. ............. 99/282 |
| 4,917,005 A | 4/1990 | Knepler ........................ 99/280 |
| 4,920,871 A | 5/1990 | Anson et al. ................. 99/295 |
| 4,995,311 A | 2/1991 | Naya et al. ................... 99/295 |
| 5,014,611 A * | 5/1991 | Illy et al. ...................... 99/280 |
| 5,044,261 A | 9/1991 | Kawazoe ..................... 99/280 |
| 5,063,836 A | 11/1991 | Patel ............................ 99/281 |
| 5,070,773 A | 12/1991 | Salomon et al. ............. 99/307 |

(Continued)

Primary Examiner—Reginald L. Alexander
(74) Attorney, Agent, or Firm—Baker Botts L.L.P.

(57) ABSTRACT

A brewing apparatus including a housing having a movable lid and a brewing area under the lid; a hot water heater connected to the housing; a water pump connected to the hot water heater; a controller coupled to the hot water heater and the pump; and a switch connected to the housing and adapted to be actuated by a user movable member. The switch is coupled to the controller. The controller is adapted to discontinue heating by the heater when the switch is moved to a deactuated position.

14 Claims, 13 Drawing Sheets

U.S. PATENT DOCUMENTS

| | | | |
|---|---|---|---|
| 5,111,969 A | 5/1992 | Knepler | 222/54 |
| 5,113,752 A | 5/1992 | Brewer | 99/295 |
| 5,146,839 A | 9/1992 | Gockelmann et al. | 99/287 |
| 5,161,455 A | 11/1992 | Anson et al. | 99/280 |
| 5,178,058 A | 1/1993 | Van Dort et al. | 99/295 |
| 5,186,096 A | 2/1993 | Willi | 99/282 |
| 5,197,374 A | 3/1993 | Fond | 99/295 |
| 5,287,797 A | 2/1994 | Grykiewicz et al. | 99/295 |
| 5,309,821 A | 5/1994 | Knepler | 99/282 |
| 5,325,765 A | 7/1994 | Sylvan et al. | 99/295 |
| 5,347,916 A | 9/1994 | Fond et al. | 99/295 |
| 5,375,508 A | 12/1994 | Knepler et al. | 99/280 |
| 5,388,501 A | 2/1995 | Hazan et al. | 99/285 |
| 5,404,794 A | 4/1995 | Patel et al. | 99/280 |
| 5,440,972 A | 8/1995 | English | 99/282 |
| 5,455,887 A | 10/1995 | Dam | 392/467 |
| 5,477,775 A | 12/1995 | Delhom et al. | 99/299 |
| 5,511,465 A * | 4/1996 | Friedrich et al. | 99/286 |
| 5,531,152 A | 7/1996 | Gardosi | 99/289 R |
| 5,549,035 A | 8/1996 | Wing-Chung | 99/281 |
| 5,584,229 A | 12/1996 | Anson | 99/280 |
| 5,590,581 A | 1/1997 | Strub et al. | 99/302 R |
| 5,619,902 A * | 4/1997 | Schotte | 99/281 |
| 5,634,394 A | 6/1997 | Cortese | 99/295 |
| 5,649,472 A | 7/1997 | Fond et al. | 99/295 |
| 5,695,092 A | 12/1997 | Schrandt | 222/1 |
| 5,704,275 A | 1/1998 | Warne | 99/281 |
| 5,738,001 A | 4/1998 | Liverani | 99/283 |
| 5,836,236 A | 11/1998 | Rolfes et al. | 99/290 |
| 5,858,437 A | 1/1999 | Anson | 426/431 |
| 5,868,062 A | 2/1999 | Enomoto | 99/282 |
| 5,870,943 A | 2/1999 | Levi et al. | 99/287 |
| 5,875,703 A | 3/1999 | Rolfes | 99/283 |
| 5,887,508 A | 3/1999 | Estaun | 99/279 |
| 5,901,636 A | 5/1999 | Witziers et al. | 99/283 |
| 5,910,205 A | 6/1999 | Patel | 99/315 |
| 5,913,961 A | 6/1999 | Chmiel et al. | 99/286 |
| 5,931,329 A | 8/1999 | Wu | 220/212 |
| 6,000,317 A | 12/1999 | Van Der Meer | 99/282 |
| 6,021,705 A | 2/2000 | Dijs | 99/295 |
| 6,021,706 A | 2/2000 | Seguenot et al. | 99/319 |
| 6,044,754 A | 4/2000 | Fuentes | 99/295 |
| 6,082,246 A | 7/2000 | Thorn et al. | 99/284 |
| 6,098,525 A | 8/2000 | Gijzel et al. | 99/282 |
| 6,142,063 A * | 11/2000 | Beaulieu et al. | 99/283 |
| 6,164,189 A | 12/2000 | Anson | 99/281 |
| 6,192,786 B1 | 2/2001 | Gasser et al. | 99/319 |
| 6,240,831 B1 | 6/2001 | Rolfes | 99/285 |
| 6,244,162 B1 | 6/2001 | Dahmen | 99/315 |
| 6,250,209 B1 | 6/2001 | Pope | 99/323 |
| 6,260,476 B1 | 7/2001 | Pope | 99/323 |
| 6,305,267 B1 | 10/2001 | Rolfes | 99/281 |
| 6,349,631 B1 | 2/2002 | Joergensen | 99/313 |
| 6,380,521 B1 | 4/2002 | Fanzutti | 219/481 |
| 6,422,132 B1 | 7/2002 | Devine | 99/284 |
| 6,460,735 B1 | 10/2002 | Greenwald et al. | 222/146.1 |
| 6,499,388 B1 | 12/2002 | Schmed | 99/295 |
| 6,526,872 B1 | 3/2003 | Wong | 99/282 |
| 2001/0006022 A1 | 7/2001 | Joergensen | 99/303 |
| 2002/0051632 A1 | 5/2002 | Kodden | 392/471 |
| 2002/0088807 A1 | 7/2002 | Perkovic et al. | 220/654 |
| 2002/0129712 A1 | 9/2002 | Westbrook et al. | 99/279 |
| 2002/0130137 A1 | 9/2002 | Greenwald et al. | 222/54 |
| 2003/0000392 A1 | 1/2003 | Lassota | 99/279 |
| 2003/0003208 A1 | 1/2003 | Lassota | 426/433 |
| 2003/0029322 A1 | 2/2003 | Rolland | 99/318 |
| 2003/0066431 A1* | 4/2003 | Fanzutti et al. | 99/279 |

* cited by examiner

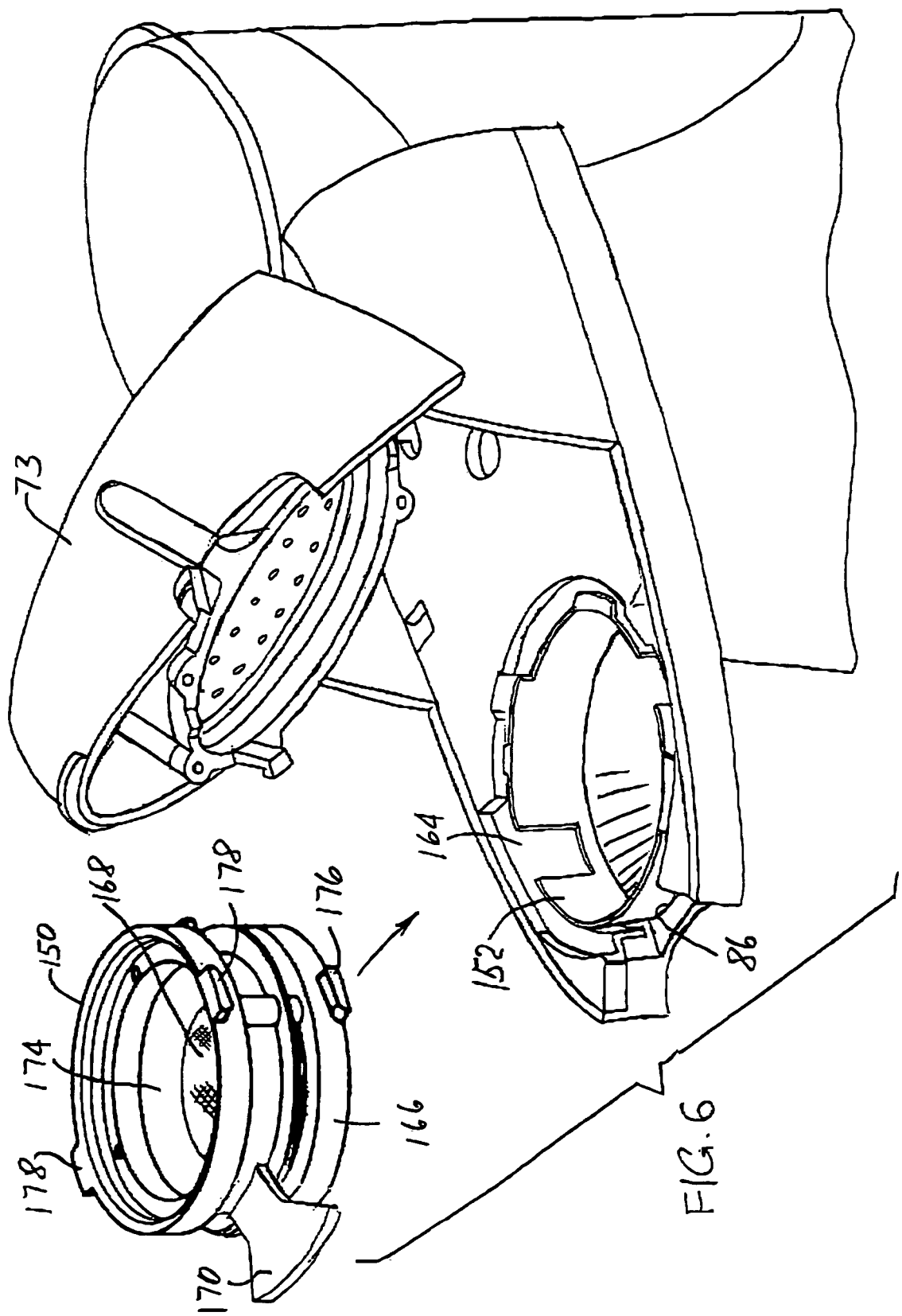

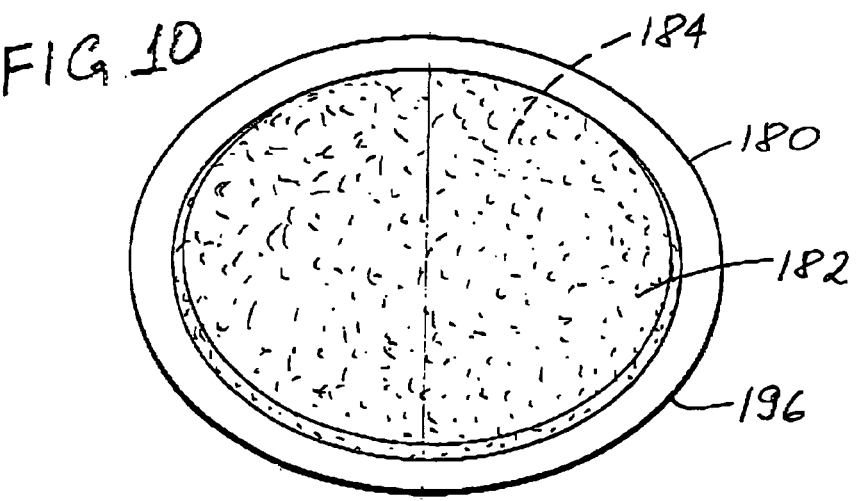
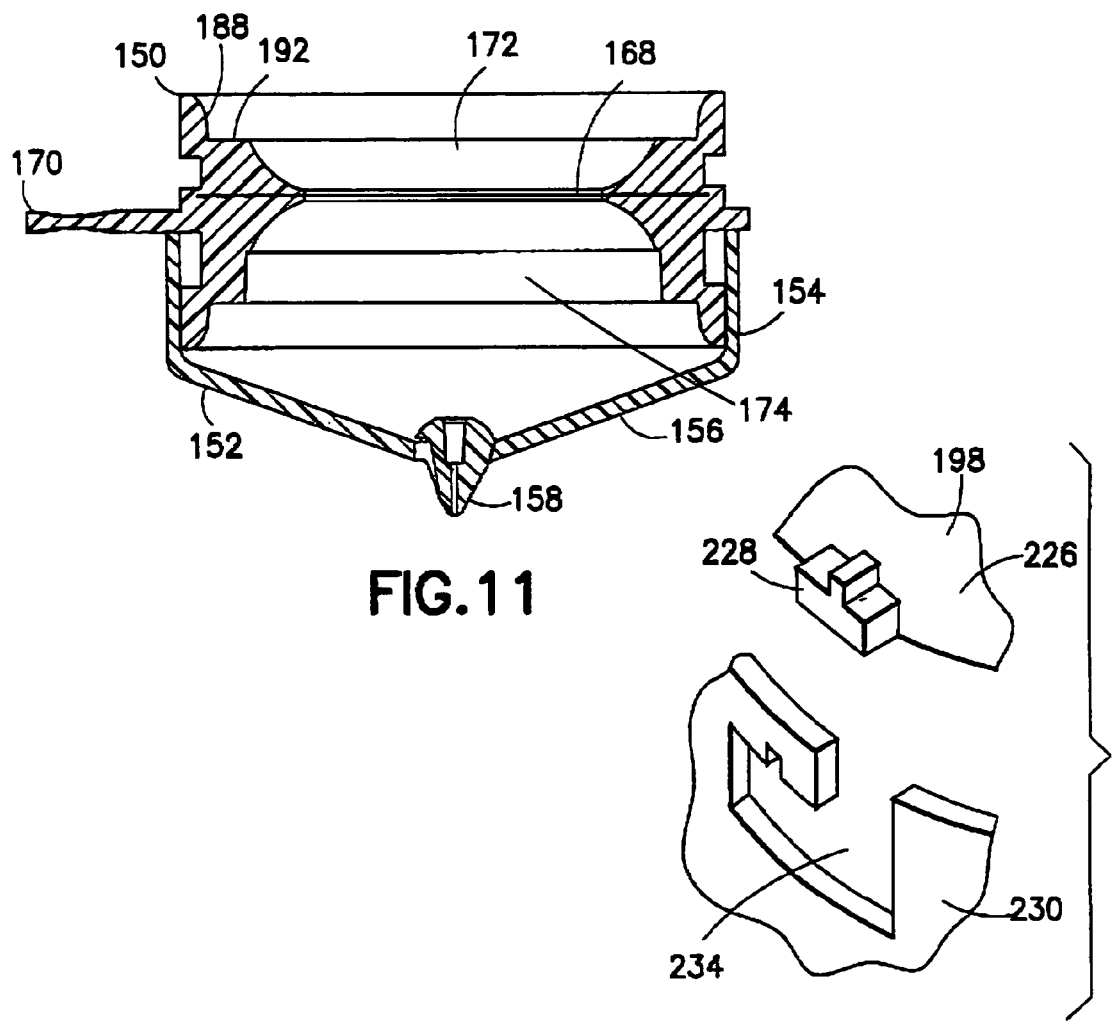

US 7,024,983 B2

BREWING APPARATUS HOT WATER CONTROL

BACKGROUND OF THE INVENTION

1. Field of the Invention

The present invention relates to a brewing apparatus, such as a coffeemaker, and more particularly to a control system used in a brewing apparatus.

2. Brief Description of Prior Developments

U.S. Pat. No. 6,240,831 B1 discloses an indicator which is used to indicate that a brewing cycle requires an extended duration before it is safe to remove the brew cone. U.S. patent Publication No. 2003/0000392 A1 discloses an automatic brew basket lock to lock the brew basket to the mount during the entire brew cycle.

A typical brewing apparatus comprises a hot water heater. At the end of a typical brewing cycle, the hot water heater undergoes a purge cycle which results in the final amount of water in the heater being turned into steam. A purge cycle effectively removes water from inside the hot water heater at the end of the brewing cycle. A brewing apparatus, such as a coffeemaker, typically has a brewing chamber which is accessible to a user for inserting and removing coffee grounds, or a pouch or pod containing coffee grounds. There is a desire for a system which prevents a user from opening in a brewing chamber during a purge cycle or, alternatively, which prevents a heater from continuing with a purge cycle when a user has opened the brewing chamber.

SUMMARY OF THE INVENTION

In accordance with one aspect of the present invention, a brewing apparatus is provided including a housing having a movable lid and a brewing area under the lid; a hot water heater connected to the housing; a water pump connected to the hot water heater; a controller coupled to the hot water heater and the pump; and a switch connected to the housing and adapted to be actuated by a user movable member. The switch is coupled to the controller. The controller is adapted to discontinue heating by the heater when the switch is moved to a deactuated position.

In accordance with another aspect of the present invention, a brewing apparatus is provided comprising a housing having a movable lid and a brewing area under the lid; a hot water heater connected to the housing; a water pump connected to the hot water heater; a controller coupled to the hot water heater and the pump; and a lock for retaining the lid in a closed position, the lock comprising an electromechanical member coupled to the controller. The controller is adapted to prevent the lock from being opened until an occurrence of a predetermined event.

In accordance with one method of the present invention, a method of controlling delivery of hot water to a brewing area in a brewing apparatus is provided comprising steps of sending a signal to a controller of the brewing apparatus when a user moves a user movable lever away from a brewing position; deactivating a fixed power hot water heater of the brewing apparatus when the controller receives the signal; and continuing to pump water through the hot water heater by a pump of the brewing apparatus after the hot water heater has been deactivated to prevent steam from being generated in the hot water heater.

In accordance with another aspect of the present invention, a method of controlling delivery of hot water to a brewing area in a brewing apparatus is provided comprising steps of moving an electromechanical latch to a locked position at a start of a brewing cycle of the brewing apparatus, the locking position preventing a movable lid at the brewing area of the brewing apparatus from being moved from a closed position; and moving the latch to an unlocked position after an end of a purge cycle of the brewing cycle to allow a purge of water and steam from a hot water heater of the brewing apparatus into the brewing chamber before the lid can be moved to an open position.

BRIEF DESCRIPTION OF THE DRAWINGS

The foregoing aspects and other features of the present invention are explained in the following description, taken in connection with the accompanying drawings, wherein:

FIG. 6 is a partial perspective view as in FIG. 4 with the coffee pod carrier shown in an exploded position;

FIG. 10 is a perspective view of a coffee pod for use with the coffeemaker shown in FIG. 1;

FIG. 11 is a cross sectional view similar to FIG. 9 with the coffee pod carrier located in a reversed, flipped different position;

FIG. 13 is an exploded perspective view of an attachment between the coffee pod carrier and funnel shown in FIG. 12;

DETAILED DESCRIPTION OF THE PREFERRED EMBODIMENTS

Figure 1:
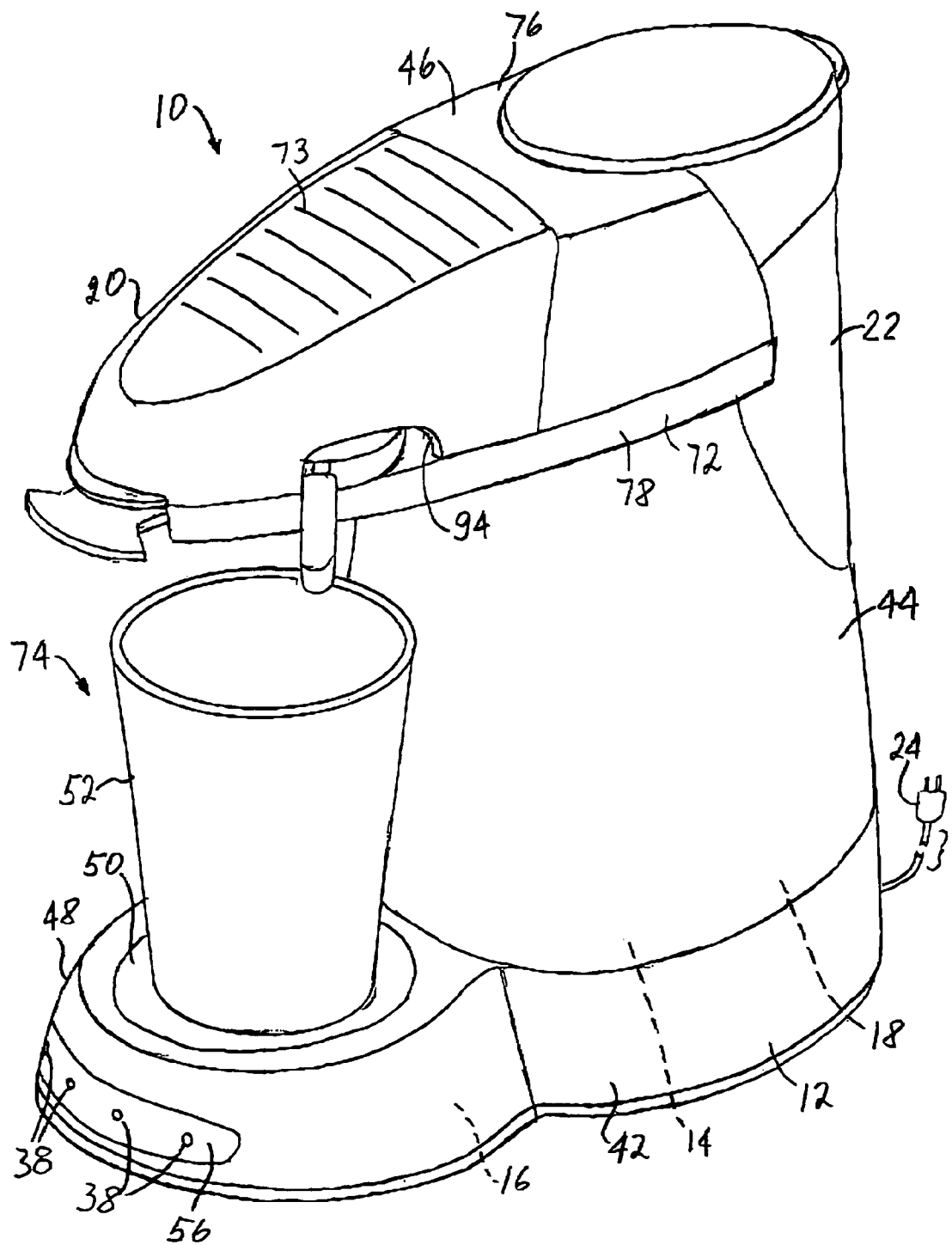
FIG. 1 is a perspective view of a coffeemaker incorporating features of the present invention.

Referring to FIG. 1, there is shown a perspective view of a brewing apparatus 10 incorporating features of the present invention. Although the present invention will be described with reference to the exemplary embodiment shown in the drawings, it should be understood that the present invention can be embodied in many alternate forms of embodiments.

In addition, any suitable size, shape or type of elements or materials could be used. A similar brewing apparatus is described in U.S. Patent application No. 60/327,538 filed Oct. 5, 2001; U.S. patent application Ser. No. 10/260,045 filed Sep. 30, 2002; and PCT application No. PCT/US02/30565 which are hereby incorporated by reference in their entireties.

In the embodiment shown, the brewing apparatus 10 comprises a coffeemaker. However, in alternate embodiments of the present invention, the brewing apparatus could comprise any suitable type of brewing apparatus such as, for example, a cappuccino maker or a tea maker. The coffeemaker 10 generally comprises a housing 12, a hot water heater 14, a controller 16, a pump 18, a pod receiving section 20, and a water reservoir 22. The coffeemaker is a single serve coffeemaker. More specifically, the coffeemaker is adapted to make a single serving of coffee at a time, such as a single cup or mug.

Figure 2:
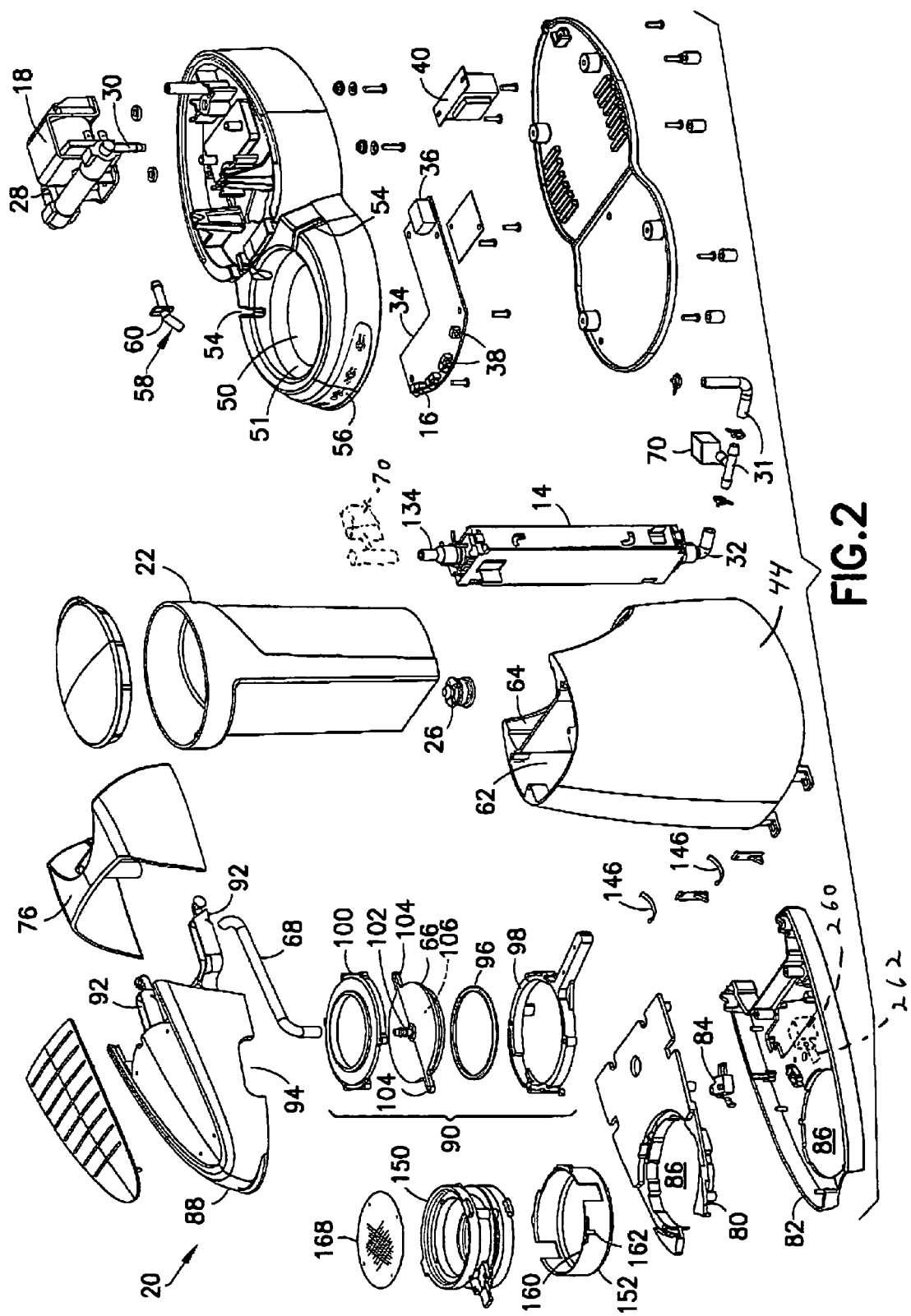
FIG. 2 is an exploded perspective view of the coffeemaker shown in FIG. 1.

The coffeemaker 10 is adapted to be plugged into an electrical outlet by a removable plug 24. The water reservoir 22 is removable from the housing 12. In an alternate embodiment, the coffeemaker might not include a removable water reservoir, such as when the coffeemaker is connected directly to a water supply line or if the water reservoir is non-removable. Referring also to FIG. 2, the water reservoir 22 includes a seal 26 for removably coupling the water reservoir with an inlet 28 to the pump 18. The pump 18 includes an outlet 30 which is connected by tubing 31 to an inlet 32 of the hot water heater 14.

The pump 18 preferably comprises a direct drive solenoid pump which can vary the flow rate of water therethrough by adjustably controlling the speed of the pump. In alternate embodiments, any suitable type of pump could be used. The pump 18 is connected to the controller 16. The controller 16 comprises a printed circuit board 34 with a processor 36 and control switches 38. The controller 16 is adapted to control the speed of the pump 18 based upon sensor input, input from the control switches 38, and pre-programming. The controller 16 is also adapted to control activation of the hot water heater 14. More specifically, the controller 16 is connected to a relay 44 for controlling the supply of electricity to the hot water heater 14.

The housing 12 forms a general frame for the coffeemaker. As seen in FIG. 1, the housing 12 includes a base section 42, a column section 44, and a top section 46. The column section 44 is supported on a rear portion of the base section 42. The pump 18 is mounted on top of the base section 42 with the column section 44 surrounding the pump 18. The base section 42 forms a forward extending section 48. The controller 16 is located inside the base section 42 with the control switches 38 extending out of apertures at the front end of the forward extending section 48. The top side of the forward extending section 48 forms a support surface 50. The support surface 50 is adapted to support a cup or container 52, such as a cup or mug, or any other type of liquid single user container, thereon. The support surface 50 can be flat or in a recess 51, or recessed as shown in FIG. 2. In the embodiment shown in FIG. 2, the sidewalls which form the recess at the support surface 50 comprise overflow slots 54. The overflow slots 54 allow the fluid to flow out of the recess, in the event fluid overflows into the recess, and prevents the overflowing fluid from overflowing onto the user control section 56 having the control switches 38. The slots 54 can also be used to support attachment of a removable elevated cup support platform 244 (see FIG. 14) as further described below.

In the embodiment shown, the coffeemaker also comprises a system 58 for detecting when an overflow condition has occurred. The system 58 includes a tube 60 which is connected to the pump 18 or a sensor. A front end of the tube 60 extends into the recess 51 at the support surface 50. In the event the recess fills with fluid, the tube 60 can transport some of the fluid in the tube to the pump or a sensor to signal the overflow condition. The pump 18 and/or the controller 16 can then automatically deactivate the pumping action of the pump 18 to prevent further overflow. However, in alternate embodiments, any suitable type of overflow sensing system could be provided. In another alternate embodiment, an overflow sensing system might not be provided.

Figure 3:
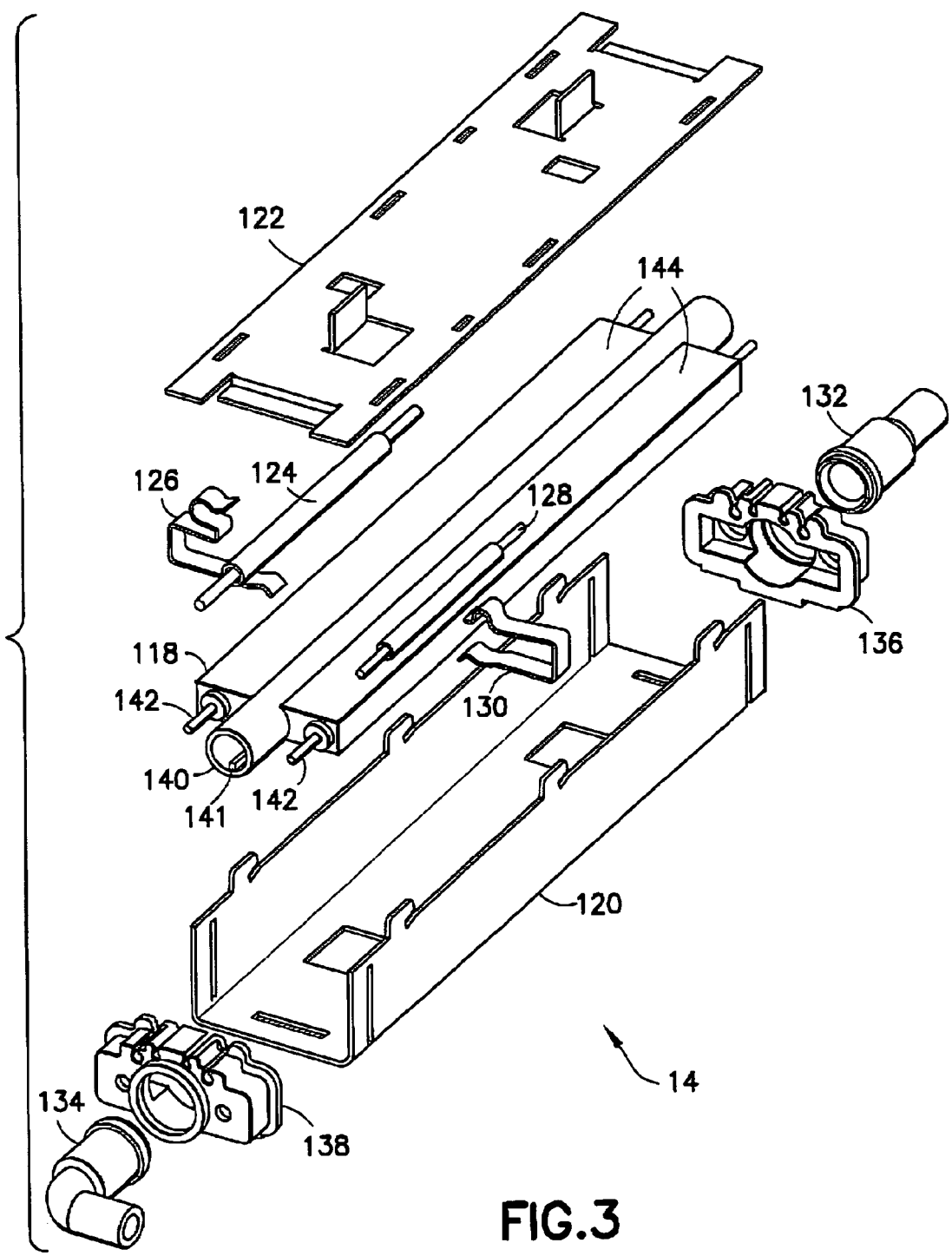
FIG. 3 is an exploded perspective view of the hot water heater used in the coffeemaker shown in FIG. 2.

The column section 44 of the housing supports the hot water heater 14 in a front section 62. The column section 44 also has a receiving area 64 for removably receiving the water reservoir 22. Referring now also to FIG. 3, an exploded perspective view of the heater 14 is shown. The heater 14 generally comprises a water heating subassembly 118, heat shield members 120, 122, thermal cutoffs (TCO) 124, a TCO clip 126, a thermistor 128, a thermistor clip 130, top and bottom water tube fittings 132, 134, and top and bottom end caps 136, 138. However, in alternate embodiments, the heater could comprise additional or alternative components.

The thermistor is used to measure the temperature of the hot water generator for determining an end of a pre-heat cycle and, to help insure that the hot water generator is at a temperature for generating the hot water in a temperature range to provide proper brewing and a preferred coffee temperature. If too hot, the power to the heating elements can be turned OFF. If too cool, the pump can be stopped or its speed lowered. The thermistor also provides over-temperature sensing, such as when water flow to the heater stops (such as when the water reservoir becomes empty). The coffeemaker also comprises a temperature sensor 70 (see FIG. 2) connected to the tubing 31. The temperature sensor 70 can sense the temperature of the water entering the inlet 32 of the heater 14. In an alternate embodiment, the temperature sensor 70 could be located connected to the tube 68 for measuring the temperature of the water exiting the heater 14.

The water heating subassembly 118 generally comprises a water conduit tube 140, two heating elements 142, and blocks 144 of heat conductive material which connect the heating elements 142 to the water conduit tube 140. In a preferred embodiment, the two heating elements 142 are Calrods. However, in alternate embodiments, any suitable type of heating element could be used. In addition, more or less than two heating elements could be used. In a preferred embodiment, the tube 140 and the blocks 144 are formed as a single extruded aluminum member. The heating elements 142 are connected to the one-piece member after it is formed. In a preferred embodiment, the inside of the tube 140 comprises one or more heat transfer fins 141. However, in an alternate embodiment, the fins 141 might not be provided. Alternatively, any suitable type of internal heat transfer members could be provided inside the tube 140. Formation of the tube 140 as an extruded member makes formation of heat transfer members inside the tube relatively easy. In an alternate embodiment, the blocks 144 of heat conductive material are comprised of cast aluminum and are subsequently connected to the tube. However, in alternate embodiments, the blocks 144 could be comprised of any suitable type of material. In addition, more or less than two blocks could be used.

Blocks 144 function as mechanical attachments for the heating elements 142 to the water conduit tube 140. In addition, the blocks 144 also function as heat transfer elements to transfer heat from the heating elements 142 to the water conduit tube 140. The heating elements 142 are connected to the relay 40 which is controlled by the controller 16. In an alternate embodiment, any suitable type of water heating subassembly could be provided.

The TCO 124 and the thermistor 128 are mechanically attached to the subassembly 118 by the two clips 126, 130. However, in alternate embodiments, any suitable means could be used to attach the TCO 124 and the thermistor 128 to the subassembly 118. For example, the TCO 124 and/or the thermistor 128 could be integrally formed with the subassembly 118. The TCO 124 and the thermistor 128 are operably electrically connected to the controller 24. In an alternate embodiment, any suitable type of a temperature sensor or thermal fuse could be provided.

The shield members 120, 122 and end caps 136, 138 substantially surround the water heating subassembly 118. The two fittings 132, 134 are connected to opposite ends of the water conduit tube 140. The bottom tube fitting 132 is connected to the tubing 31. The top tube fitting 134 is connected to a hot water discharge head 66 by a tube 68 (see FIG. 2). As seen best in FIG. 2, the heater 14 is orientated in a substantially vertical orientation with its water inlet 32 at its bottom end and its heated water outlet at its top end. However, in an alternate embodiment, the heater could be orientated in any suitable orientation. The heater in this embodiment has a substantially straight shape. However, in an alternate embodiment, the heater could have any suitable type of shape, such as L shaped for example. For the vertical heater shown, the water being pushed upward into the inlet 32 contacts the entire inner diameter surface of the water conduit tube 140. In addition, the water is retained in the water conduit tube 140 by gravity until the water is pushed out of the top outlet at fitting 134 by new incoming water. This ensures maximum heat transfer to the water in the water conduit tube 140 before the water flows out of the top outlet fitting 134.

In a preferred embodiment, the heater is a 1400 Watt heater at 120 Volts. However, in alternate embodiments, any suitable heater could be provided. A 1400 Watt heater allows the heater to be able to increase in temperature from room temperature to heat water to 180° F. within one minute. In alternate embodiments, temperature sensors could be provided in the water reservoir and/or at the outlet from the heater for more precise hot water generation. Of course, not every electrical outlet has exactly 120 Volts. In addition, power from the power company can fluctuate, such as during a brownout. Manufacturing tolerances for the heater are preferably +5% to −10% Wattage variation. Thus, for a same type of heater from the same manufacturer, at 128 Volts the heater would have an output of 1950 Watts, and at 107 Volts the heater would have an output of 1100 Watts. The present invention recognizes this and uses the controller to compensate by controlling operation of the pump and heater. The thermistor 128 and temperature sensor 70 monitor the hot water generator and the incoming water temperature, and sends signals to the controller 16 such that the controller can take action to adjust or correct the temperature of the water while the water is still inside the hot water generator. This control delivers a relatively accurate desired temperature of the hot water. This results in the best predetermine quality of brewed coffee even though the supply of electricity or the initial water temperature may not always be the same.

In a preferred embodiment, the controller can control the heater 14 and the pump 18, based at least partially upon the temperature of the heater sensed by the thermistor 128 and the temperature of the incoming water sensed by the temperature sensor 70. For example, during the winter or in a cold weather climate the speed of the pump 18 might need to be slower than the during the summer or in a warm weather climate. The controller 16 can be programmed to, at least initially, control the speed of the pump 18 based upon the incoming water temperature as sensed by the temperature sensor 70. The use of two sensors 70, 128 can also do away with the pre-heating cycle, or at least reduce the pre-heating cycle. Preferably, the controller 16 is programmed to control the speed of the pump 18 based upon the temperatures sensed by the two sensors 128, 70. The programming of the controller 16 can comprises an algorithm or a lookup table, for example.

In a preferred embodiment, the controller 16 performs a pre-heat cycle of the heater before the pump 18 is actuated, such as about one minute. In an alternate embodiment, a pre-heat cycle might not be provided. The pre-heat cycle could be longer or shorter than one minute, such as merely 10 seconds for example when the speed of the pump 18 is initially set at a slow speed while the heater is being initially heated. In one type of pre-heat cycle, the pump 18 is not turned ON until the heater 14 has reached a predetermined minimum temperature. After the predetermined minimum temperature is reached, the controller 16 then actuates the pump 18 to start pumping water into the heater. However, the speed of the pump 18 does not need to be constant as explained above. The controller continuously monitors the temperature of the heater and the inlet water. If the temperature of the heater goes above a predetermined out-of-range upper temperature, the controller shuts the heater OFF, but continues pumping water through the pump to the heater. If the temperature of the heater goes below a predetermined out-of-range lower temperature, the controller shuts the pump OFF until the temperature of the heater rises again. Then, the pump is turned ON again.

In the situation when the coffee maker is used again when the heater is still hot from a previous brewing cycle, the controller could turn the pump ON without use of the pre-heat cycle; such as when a user starts the coffee maker when the temperature of the heater is between the out-of-range lower and upper temperatures. The out-of-range lower and upper temperatures could be fixed or could be varied based upon predetermined conditions, such as pod recognition or coffee maker system state.

Figure 4:
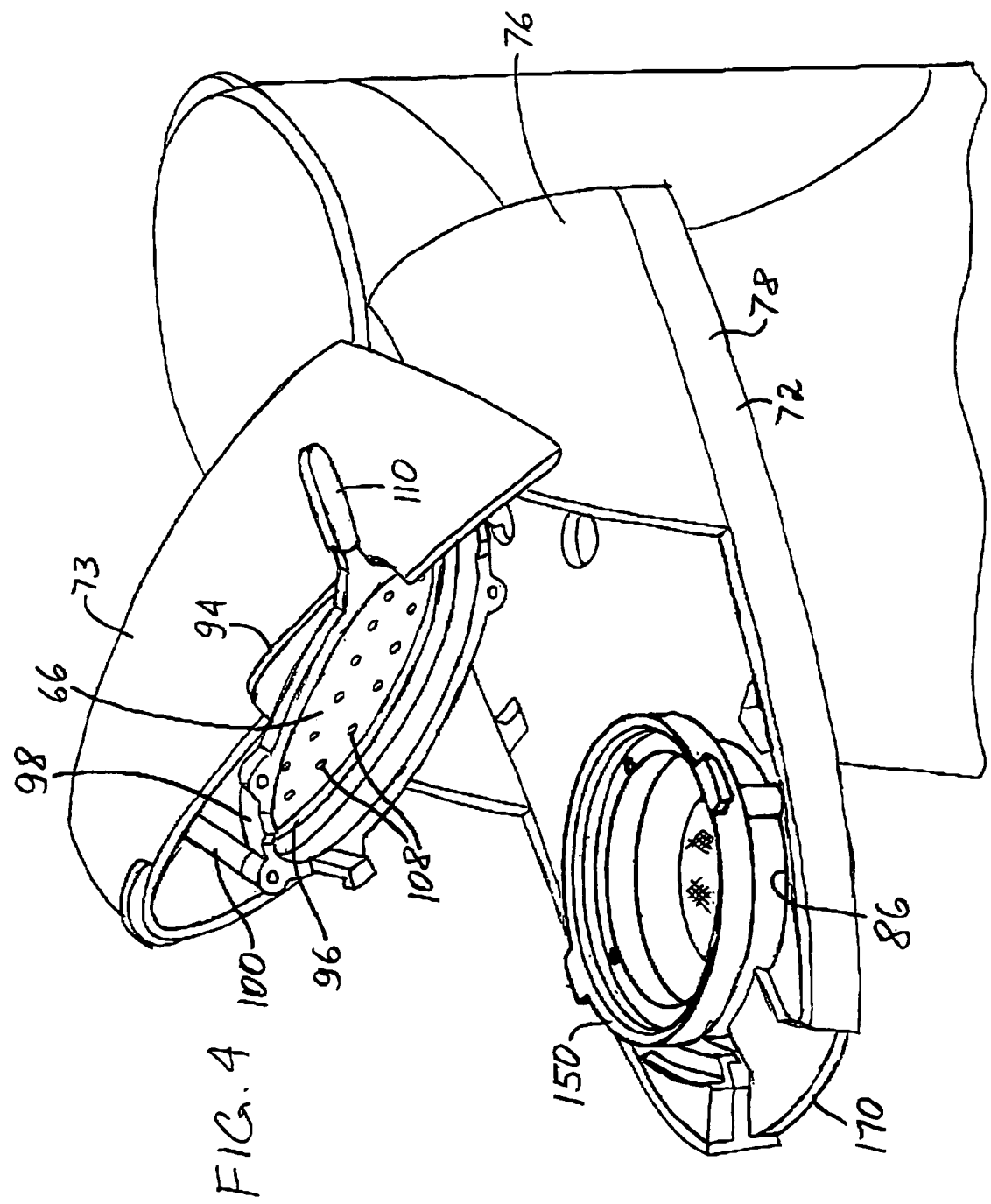
FIG. 4 is a partial perspective view of the top of the coffeemaker shown in FIG. 1 with the lid moved to an open position.

Referring now to FIGS. 1, 2 and 4, the top section 46 of the housing 12 comprises a stationary section 72 and a movable lid 73. The top section 46 is connected to the top of the column section 44. The top section 46 extends outward in a general cantilevered fashion from the top of the column section 44. More specifically, the top section 46 extends outward over the forward extending section 48 of the base section 42. This forms a cup receiving area 74 between the support surface 50 and the top section 46. The stationary section 72 comprises a top section 76 and a bottom section 78. The bottom section 78 comprises two members 80, 82 (see FIG. 2). The two members 80, 82 form an internal area which houses a switch 84. The switch 84 is connected to the controller 16. The stationary section 72 forms an aperture 86 for receiving various components as further described below.

The movable lid 73 is pivotably connected to the stationary section 72. A brewing area is formed under the lid 73 when the lid is located at a closed, down position. The lid 73 comprises a main lid member 88 and an assembly 90. The main lid member 88 comprises two rearwardly extending pivot arms 92. The rear ends of the pivot arms 92 are pivotably attached to the rear end of the stationary section 72 at the top rear of the housing 12. Springs 146 could be provided to bias the lid 88 in the open position shown in FIG. 4. In an alternate embodiment, the spring(s) could bias the lid in the closed position shown in FIG. 1. However, a spring for the lid 73 does not need to be provided. The lid 73 could comprise a latch (not shown) for latching the lid in a closed position with the stationary section 72. For example, the main lid member 88 could comprise a resilient deflectable latch. In an alternate embodiment, the latch for retaining the lid in the closed position could be mounted on the stationary section 72 and adapted to engage the main lid member 88. One side of the main housing member 88 comprises a slot 94.

Referring particularly to FIG. 2, the assembly 90 generally comprises the hot water discharge head 66, a seal 96, a combined locking and cam ring member 98, and a mounting member 100. The discharge head 66 has a general showerhead design. The hot water discharge head 66 generally comprises a top water inlet 102, mounting flanges 104, an internal plenum 106, and bottom side outlet apertures 108 (see FIG. 4). The inlet 102 is connected to the tube 68 from the hot water heater 14. The mounting flanges 104 are used to stationarily attach the discharge head 66 to the main lid member 88. The outlet apertures 108 allow hot water to exit the discharge head in a downward direction. In a preferred embodiment, the outlet apertures 108 are arranged to deliver a greater quantity of water towards the outer perimeter than the center of the bottom side of the discharge head. However, any suitable type of array or configuration of the outlet apertures could be provided. In addition, any suitable type of discharge head could be provided.

The seal 96 is attached to the bottom side of the discharge head 66 at its outer perimeter. The seal 96 comprises an O-ring seal. The mounting member 100 is located above the top side of the discharge head 66, and is adapted to slidably rotate on the top side of the discharge head. The ring member 98 is fixedly attached to the mounting member 100. The ring member 98 extends below the discharge head 66 and is adapted to rotate relative to the discharge head 66 due to its suspended connection with the mounting member 100.

Figure 5:
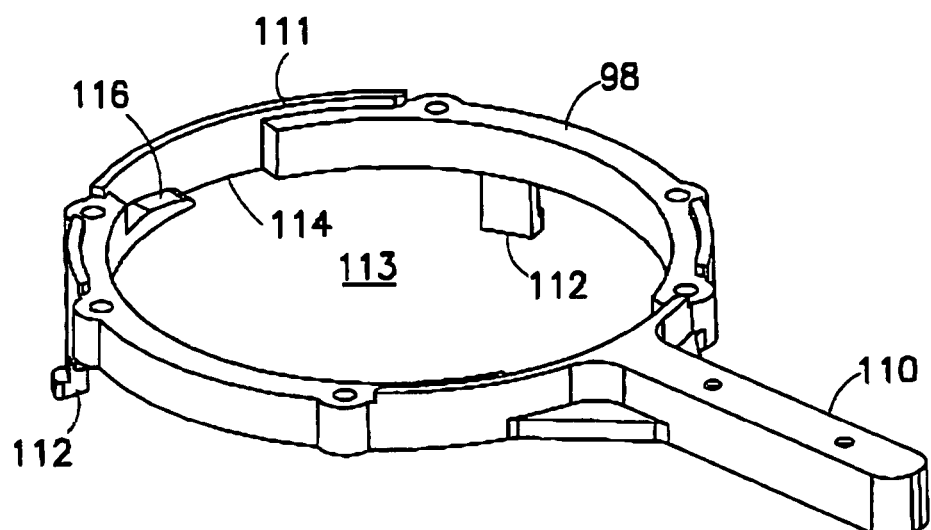
FIG. 5 is a perspective view of the combined locking and cam ring member shown in FIG. 2.

Referring also to FIG. 5, The ring member 98 generally comprises a handle 110 and a center ring section 111. The center ring section 111 generally comprises a main center aperture 113, three equi-spaced locking projections 112, two opposing slots 114, and two opposing cam surfaces 116. The locking projections 112 extends downward from the ring section. The slots 114 are located along an interior side of the ring section at the main center aperture 113. The cam surfaces 116 are located adjacent the slots 114. The handle 110 extends out of the slot 94 in the main lid member 88. The handle 110 can move in the slot 94 as the ring member 98 is rotated. More specifically, a user can moved the handle to rotate the ring member 98 between a locked position (shown in FIG. 1) and an unlocked position (shown in FIG. 4). The hot water discharge head 66 remain stationary as the ring member 98 is rotated between its locked and unlocked positions.

The stationary section 72 comprises slots 148 along the aperture 86 to allow the locking projections 112 of the ring member 98 to pass therethrough. When the lid 73 is located in its down, closed position and the ring member 98 is rotated to its locked position, bottom portions of the locking projections 112 are moved beneath portions of the stationary section 72 to latch the lid 73 in its closed position. When the ring member 98 is moved back to its unlocked position, the locking projections 112 can once again be passed through the slots 148 to allow the lid 73 to be moved back to its open position. In alternate embodiments, any suitable type of locking system could be provided.

Figure 7:
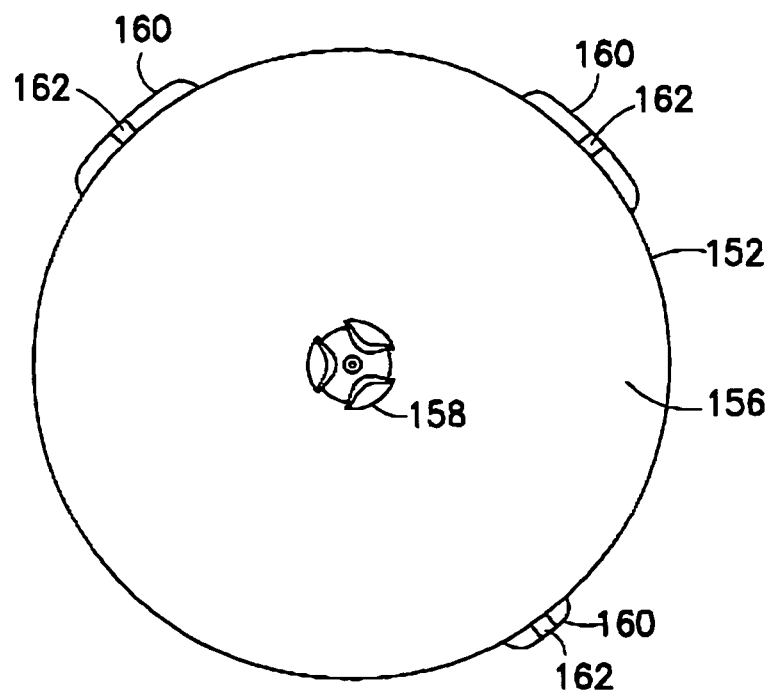
FIG. 7 is a bottom plan view of the funnel shown in FIGS. 2 and 6.
Figure 8:
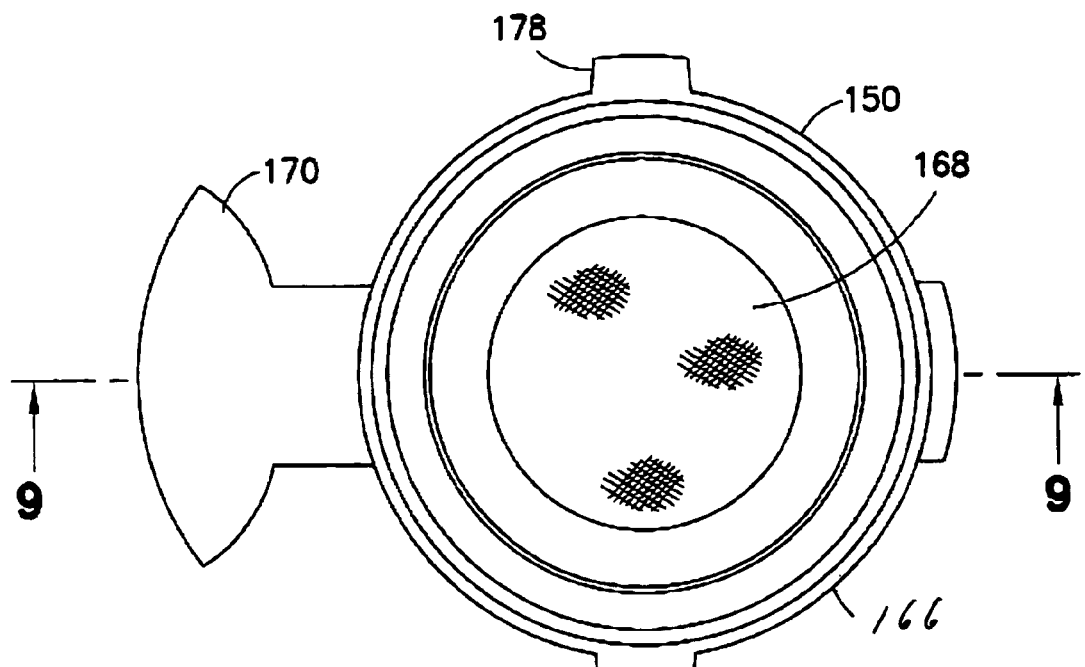
FIG. 8 is a top plan view of the pod carrier and funnel shown in FIGS. 4 and 6.

Referring also to FIG. 6, the coffeemaker 10 includes a pod carrier 150 and a discharge funnel 152. The carrier pod 150 and the discharge funnel 152 are adapted to be removably connected to the stationary section 72 at the aperture 86. Referring also to FIGS. 7 and 8, the funnel 152 generally comprises an upper circular wall section 154, a lower cone-shaped wall section 156, and an outlet 158 at the bottom center of the lower cone-shaped wall section 156. The upper wall section 154 includes slots 164 (see FIGS. 2 and 4). The slots 164 are provided to accommodate projections on the pod carrier 150 as further described below. The funnel 152 includes support ledges 160 extending outward from a top side of the upper wall section 154. Keying sections 162 extends downward from the support ledges 160. The stationary section 72 includes slots for receiving the keying sections 162, and the support ledges 160 are adapted to be supported on a top side of the stationary section 72 at the aperture 86. Thus, the funnel 152 can be dropped into the aperture 86 with the support ledges 160 supporting the funnel on the stationary section and the keying sections 162 aligning the funnel in the aperture 86 in a predetermined position.

The pod carrier 150 generally comprises a frame 166 and a center support 168. The frame 166 comprises a one piece member made of molded plastic or polymer material. The center support 168 preferably comprises a metal screen member. However, in alternate embodiments, any suitable type of center support could be provided. The frame 166 is preferably over molded onto the outer perimeter of the center support 168. This fixedly attaches the center support 168 to the frame 166. However, in alternate embodiments, any suitable attachment system could be used. The center support 168 provides three functions. First, the center support 168 divides the frame 166 into two sections; each section having a distinct pod receiving area. Second, the center support 168 provides a path to allow fluid to flow through the center support from one pod receiving area to the other pod receiving area. Third, the center support 168 helps to provide a support surface for supporting a pod of material in either one of the two pod receiving areas as further described below.

Referring particularly to FIGS. 4, 6, 8 and 9, the frame 166 includes a handle 170, a first pod receiving area or cavity 172, a second pod receiving area or cavity 174, and two sets of lateral extending cam projections 176, 178. As noted above, the two pod receiving areas 172, 174 are separated from each other by the center support 168. The two pod receiving areas 172, 174 are adapted to receive pods 180, one of which is shown in FIG. 10. The pod 180 generally comprises a porous casing 182 and an interior area comprising material to be brewed, such as coffee grounds 184. The casing 182 is comprised of a material similar to coffee filter paper. Thus, hot water can flow into the top side of the casing 182 and exit the bottom side of the casing as brewed coffee. Each pod 180 is preferably a single serve pod; i.e., each pod can be used to generate a single serving, such as one cup, of coffee.

The first pod receiving area 172 has a first open entrance aperture on a first side of the frame, and the first pod receiving area is sized and shaped to receive one of the coffee pods 180. The second pod receiving area 174 is about twice as large as the first pod receiving area 172. The second pod receiving area 174 has a second open entrance aperture on a second side of the frame, and the second pod receiving area is sized and shaped to receive two of the coffee pods 180; one pod stacked on top of the other pod inside the receiving area. In an alternate embodiment, a single larger coffee pod (not shown) could be positioned into the second pod receiving area 174. The coffee pod(s) 180 are held in the first or second pod receiving areas 172, 174 merely by gravity; at least before the lid 73 is moved to its closed position. Thus, the first pod receiving area 172 can receive and hold one of the pods 180 only when it is orientated facing a top side of the pod carrier 150. Likewise, the second pod receiving area 174 can receive and hold two of the pods 180 only when it is orientated facing the top side of the pod carrier 150. The pod carrier 150 is adapted to be flipped 180 degrees to hold either one pod 180 in the first pod receiving area 172 or two pods 180 in the second pod receiving area 174.

Figure 9:
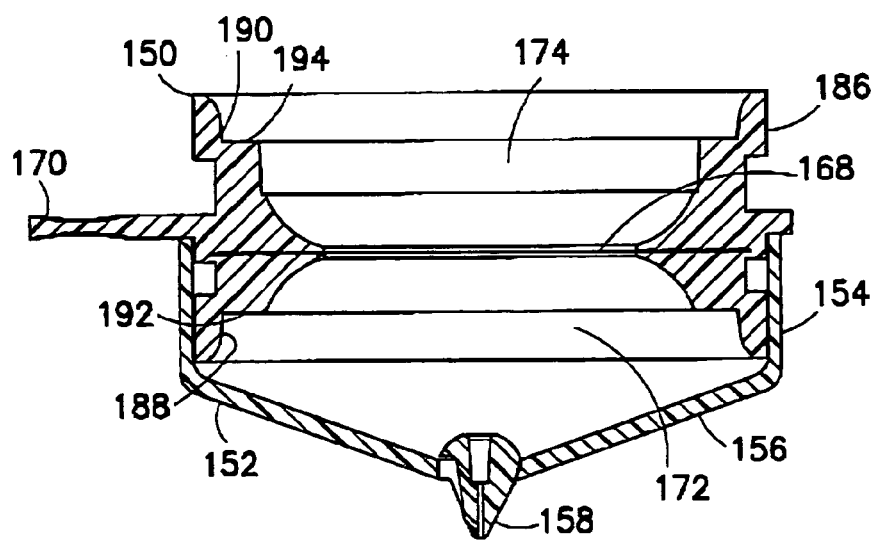
FIG. 9 is a cross sectional view of the pod carrier and funnel shown in FIG. 8 taken along line 9—9.

Referring particularly to FIG. 9, the frame 166 of the pod carrier 150 has an first open aperture on a first side at the first pod receiving area 172 and a second open aperture at a second side of the second pod receiving area 174. The frame 166 forms a surrounding perimeter wall 186 forming two inwardly facing sealing surfaces 188, 190 and two inwardly extending shells 192, 194 located at a bottom of the sealing surfaces 188, 190, respectively. The entrance apertures into the first and second pod receiving areas are defined by the perimeter wall. When the two coffee pods 180 are inserted into the second receiving area 174 the outer rim 196 of the bottom coffee pod can flex upward against the sidewalls inside the second pod receiving area 174, and the outer rim 196 of the top coffee pod can sit against the shelf 194. The bottom of the bottom coffee pod would sit against one side of the mesh screen 168. Referring also to FIG. 11, the coffee pod carrier is shown flipped 180 degrees relative to its position shown in FIG. 9. In this position, the first coffee pod receiving area 172 is located at the top of the coffee pod carrier 150. One of the coffee pods 180 can be located in the first coffee pod receiving area 172 with its outer rim 196 located against the shelf 192 and the bottom of the coffee pod being located against one side of the mesh screen 168. The handle 170 extends outward along a plane proximate a junction of the first and second pod receiving areas; slightly more toward the larger second pod receiving area than the first pod receiving area.

As seen in FIGS. 4, 6, 9 and 11, the coffee pod carrier 150 is adapted to be removably inserted into the top side of the funnel 152 when the lid 73 is located in its open position. FIGS. 4, 6 and 9 illustrate the position of the coffee pod carrier 150 into the funnel 152 inside the stationary section 72 with the second pod receiving area 174 located in the top position. When the coffee pod carrier 150 is inserted into the funnel 152 the first set of cam projections 176 slide into the slots 164 in the funnel and come to rest on the bottom sides of the slots. Because the funnel 152 is supported on the stationary section 72 by its support ledges 160, the pod carrier 150 is therefore supported on the stationary section 172 by the funnel 152. If the pod carrier 150 is inserted into the funnel 152 with the first pod receiving area 172 located in the top position as shown in FIG. 11, then the second set of cam projections 178 would be received in the slots 164 and rest against the bottom of the slots. The handle 170 is positioned in a front recess of the stationary section 72 for relatively easy grasping by a user to remove the pod carrier after use and dispose of a hot coffee pod(s) located in the carrier without the need for touching the hot coffee pod(s).

With the pod carrier 150 located in the funnel 152 the top side of the pod carrier extends above the funnel as shown in FIGS. 4 and 9. When the lid 73 is moved to its down or closed position as shown in FIG. 1, the cam projections 178 pass through the slots 114 (see FIG. 5) in the ring member 98. The bottom side of the hot water discharge head 66 and the seal 96 extend slightly into or just above the top aperture into the second pod receiving area 174. Because the pivot arms 92 of the main lid member 88 extend almost completely to the rear end of the stationary section 72, the lid 73 comes down on the pod carrier 150 at a very small angle; almost vertically, such as about merely five degrees of rotation between when the bottom of the seal 96 is located proximate the top of the aperture into the second receiving area 172 and when the lid 73 reaches its closed position. The inner top side of the surrounding perimeter wall 186 is curved to substantially prevent wear on the seal 96 when the lid 73 is merely moved to its closed position and before the pod carrier 150 is moved upward as explained below.

Figure 17:
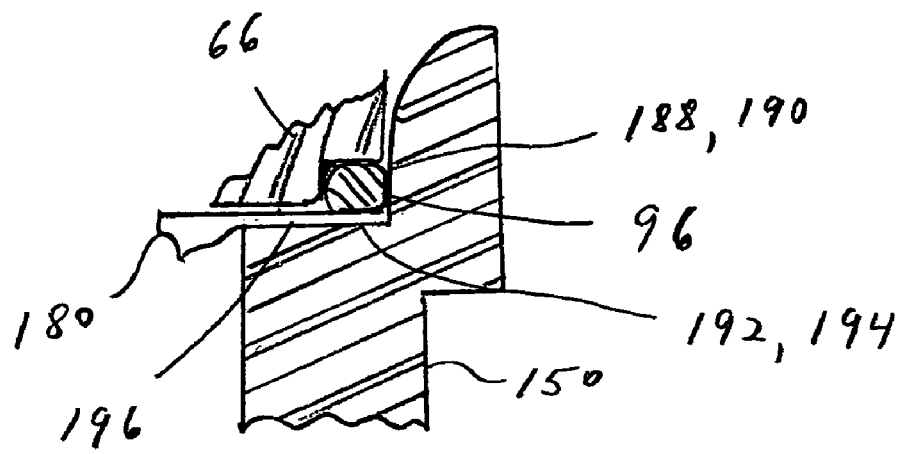
FIG. 17 is a partial cross-sectional view of the pod carrier and the seal after the seal is compressed.
Figure 16:
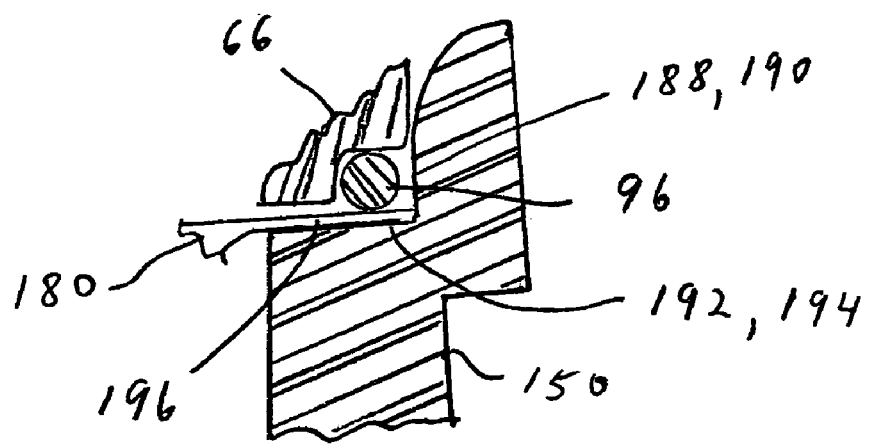
FIG. 16 is a partial cross-sectional view of the pod carrier and the seal before the seal is compressed.

When the lid 73 is in its closed position and the user rotates the handle 110 from its unlocked position to its locked position, the ring section 111 rotates, and the cam surfaces 116 engage the bottom surfaces of the cam projections 178 to cam the pod carrier 150 in an upward direction. As the pod carrier 150 moves upward, the outer rim 196 of the top coffee pod 180 in the second pod receiving area 174 is sandwiched or captured between the shelf 194 and the seal 96. This helps to clamp the pod to prevent it from moving, and to prevent hot water from the discharge head 66 from passing around the outer side of the top pod 180 without passing through the pod. Referring also to FIGS. 16 and 17, as the pod carrier 150 moves upward by the camming action of the ring member 98, the seal 96 is vertically compressed and expands or deforms in an outward direction. As the seal 96 expands outwardly, it engages the sealing surface 190 on the inner side of the perimeter wall 186 at the second receiving area 174. This seals the pod carrier frame 166 with the hot water discharge head 66 such that water discharged from the discharge head 66 must pass through the second pod receiving area 174 in order to exit through the mesh screen 168. The seal 96 also helps to clamp the rim 196 against the surface 194 to hold the rim in a stationary position. However, the sealing action is provided between the surface 190 (or 188) and the head 66 by the seal 96.

When the brewed coffee exits through the mesh screen 168 it flows through the first pod receiving area 172 and onto the inner surface of the discharge funnel 152 at the lower cone-shaped wall section 156. The brewed coffee can flow to the outlet 158 and flow out of the funnel 152 as a stream into the cup 52 located on the support surface 50. Because the funnel 152 has a relatively high upper wall section 154, the bottom side of the pod carrier 150 stays inside the funnel when the pod carrier is moved upward by the ring member 98. This ensures that the brewed coffee exits the pod carrier into the interior of the funnel even though the pod carrier has been vertically moved relative to the funnel.

If the pod carrier 150 is inserted into the funnel 152 with the first pod receiving area 172 located in the top position as shown in FIG. 11, the pod carrier 150 is located in the funnel 152 with the top side of the pod carrier extending above the funnel. When the lid 73 is moved to its down or closed position as shown in FIG. 1, the cam projections 176 past through the slots 114 (see FIG. 5) in the ring member 98. The bottom side of the hot water discharge head 66 and the seal 96 extend slightly into or just above the top aperture into the first pod receiving area 172. The inner top side of the surrounding perimeter wall 186 at the first pod receiving area 172 is curved to substantially prevent wear on the seal 96 when the lid 73 is merely moved to its closed position and before the pod carrier 150 is moved upward as explained below.

When the lid 73 is in its closed position and the user rotates the handle 110 from its unlocked position to its locked position, the ring section 111 rotates and the cam surfaces 116 to engage the bottom surfaces of the cam projections 176 to cam the pod carrier 150 in an upward direction. As the pod carrier 150 moves upward, the outer rim 196 of the coffee pod 180 in the first receiving area 172 is clamped between the shelf 192 and the seal 196. This helps to prevent the pod from moving and to prevent hot water from the discharge head 66 from passing around the outer side of the pod 180 in the first receiving area 172 without passing through the pod. As the pod carrier 150 moves upward by the camming action of the ring member 98, the seal 96 is vertically compressed and expands or deforms in an outward direction. As the seal 96 expands outwardly, it engages the sealing surface 188 on the inner side of the perimeter wall 186. This seals the pod carrier frame 166 with the hot water discharge head 66 such that water discharged from the discharge head 66 must pass through the first pod receiving area 172 in order to exit through the mesh screen 168.

When the brewed coffee exits through the mesh screen 168 it flows through the second pod receiving area 174 and onto the inner surface of the discharge funnel 152 at the lower cone-shaped wall section 156. The brewed coffee can flow to the outlet 158 and flow out of the funnel 152 as a stream. The coffeemaker has a system for varying water temperature of water exiting the heater. The system comprising the controller coupled to the sensors. The pump is a variable speed pump. Power, when the hot water heater is ON, is supplied as a substantially fixed non-varying power, and the controller is adapted to provide hot water from the heater at either a first temperature or a second higher temperature based upon speed of the pump without varying power supply to the heater. In an alternate embodiment, the system could be configured to deliver hot water at more or less than two temperatures.

Consistently repeatable good quality brewed liquid requires accurate hot water quantity delivery and relatively precise hot water temperature. Conventional coffeemakers adjust the hot water heat to control water temperature. However, because of inherent lag times for hot water heater adjustments because of heat transfer rates from the heating element to the heat transfer member of the heater and then to the water, temperature control, especially in a single serve brewing apparatus dispensing a relatively small quantity of water such as only about seven to twelve ounces, is not good and does not produce consistently repeatable good quality brewed liquid. The present invention provides a better control system for water temperature for a small serve brewing apparatus, such as an individual serving dispenser coffeemaker.

After the coffee has been brewed, the user can rotate the handle 110 back to its unlocked position and open the lid 73. The user can then grasp the coffee pod carrier 150 at the handle 170 to remove the coffee pod carrier and dispose of the used coffee pod(s). One of the features of the present invention is a reduced amount of wear on the seal 96. More specifically, the seal 96 does not run up against any of the components when it is being inserted into or removed from the aperture in the pod carrier. Only after the seal is located in the aperture in the pod carrier is it deformed to perform its sealing function. The perimeter sealing feature described above reduces wear on the seal 96 to prevent steam or water vapor from exiting from the pod brewing chamber without passing through the coffee pod. This helps to maintain an accurate and predictable good brewed coffee quality.

As noted above, the coffeemaker comprises a switch 84 (see FIG. 2) located in the stationary section 72. The ring member 98 comprises a section which is adapted to actuate the switch 84 when the ring member 98 is moved to its locked position. The ring member 98 is adapted to deactuate the switch 84 when the ring member is moved away from its locked position. The switch 84 is connected to the controller 16. When the switch 84 is actuated the controller 16 knows that the ring member 98 is at its locked position. If the user moves the ring member 98 from its locked position during a brewing cycle, the controller 16 is programmed to deactivate the heater 14. Thus, if the user opens the lid 73 during a brewing cycle, the pump 18 will continue to flow water out of the discharge head 66, but the water is prevented from being converted into potentially harmful steam because the heater 14 has been turned OFF and, the continuing flow of water through the heater 14 prevents water from standing in the heater and turning into steam. In alternate embodiments, any suitable type of signaling system or any suitable type of system for preventing a user from being potentially harmed by steam could be provided. In one type of embodiment, the controller could be programmed to continue pumping of water through the heater until the heater reached a predetermined relatively cool temperature. In another embodiment, the controller could be programmed to continue pumping of water through the heater for a predetermined amount of time after the switch is deactuated or after the heater is turned OFF.

Referring to FIG. 2, the control system could also comprise an electromagnetic solenoid 260 having an extendable shaft 262. The solenoid would be connected to the controller 16. The shaft 262 would normally be retracted at a home position when the solenoid is not actuated. When the switch 84 is actuated by the member 98, the controller activates the solenoid to move the shaft 262 forward and into engagement with the member 98. This engagement results in the member 98 no longer being able to rotate away from its locked position. Thus, the control system forms a lock to prevent the user from opening the lid 73 during a brewing cycle. Once the brewing cycle is completed, the controller 16 can deactivate the solenoid 260, thereby removing engagement between the shaft 262 and the member 98, and the user can now rotate the member 98 to allow the lid to be opened again. The controller might be programmed to move the solenoid to an unlocked position after an end of a purge cycle of the brewing cycle to allow a purge of water and steam from the heater into the brewing chamber before the lid can be moved to an open position. In alternate embodiments, any suitable type of locking system could be provided.

Figure 12:
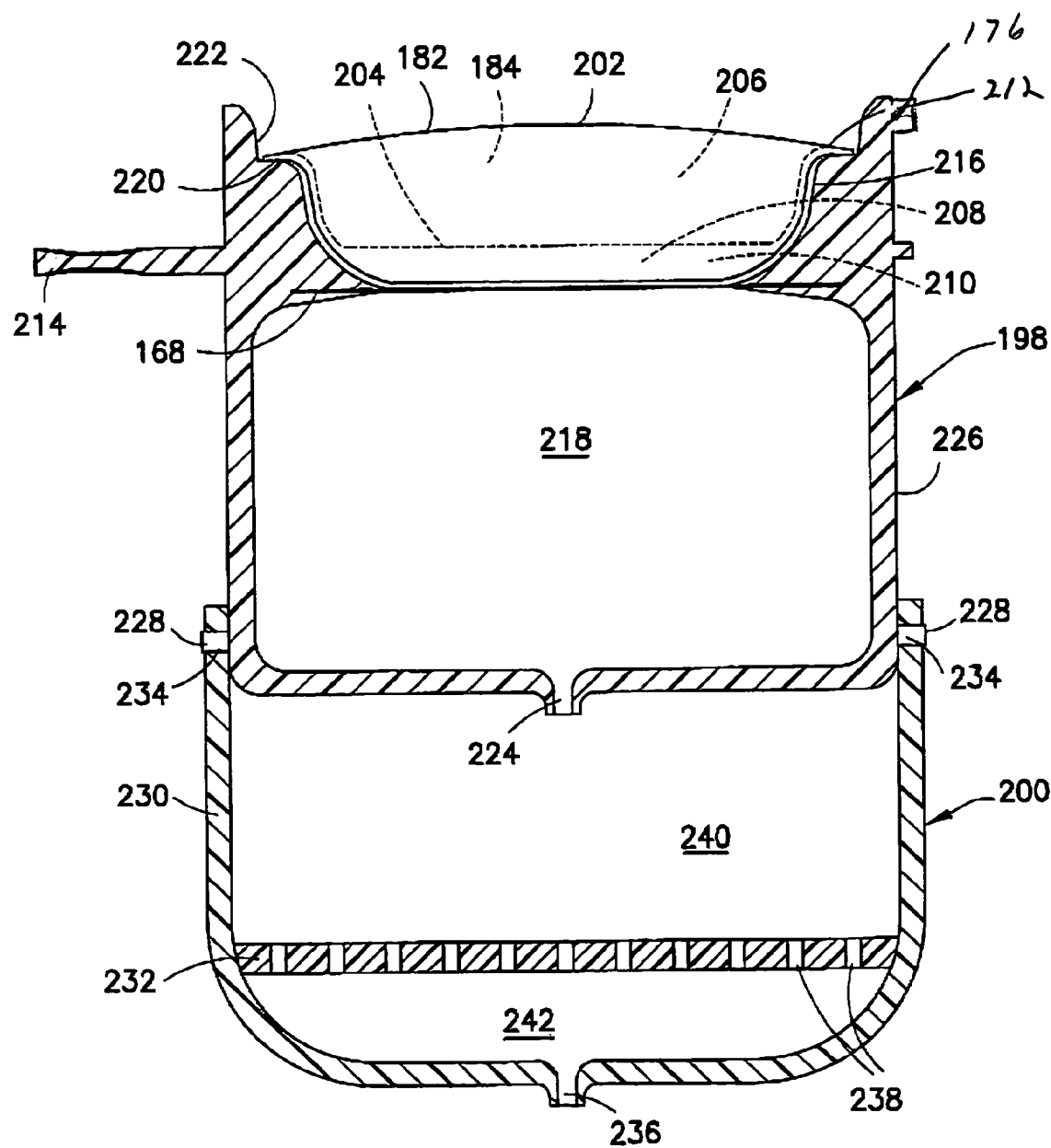
FIG. 12 is a cross sectional view of alternate embodiments of a coffee pod, coffee pod carrier, and funnel incorporating features of the present invention.

Referring now to FIGS. 12 and 13, an additional, optional feature of the present invention will be described. FIG. 12 shows a cross sectional view of a second type of pod carrier 198, a funnel and mixing or frothing attachment 200, and a second type of pod 202. The second type of pod 202, in this embodiment, is a creamy coffee pod. In particular, the creamy coffee pod 202 comprises an outer casing 182, a plastic or hard paper divider 204 which forms a first chamber 206 and a second chamber 208, coffee grounds 184 located in the first chamber 206 and a powdered nondairy creamer 210 located in the second chamber 208. The divider 204 is adapted to allow fluid to flow therethrough, but otherwise substantially separates the coffee grounds 184 from the nondairy creamer 210. In the embodiment shown, the divider 204 extends to the outer rim 212 where the top and bottom sides of the casing 182 are connected to the divider 204. In an alternate embodiment the pod could have more than one divider, and nondairy creamer might not be provided such as when the chambers of the pod merely comprise different types of coffee grounds, such as one or more different flavored coffee grounds.

The pod carrier 198 generally comprises a handle 214, a pod receiving area 216, and a lower chamber 218. The pod receiving area 216 is adapted to receive the pod 202. The pod receiving area 216 includes a shelf 220 and a sealing surface 222 on an inwardly facing perimeter side. The pod carrier 198 is adapted to be inserted into the aperture 86 in the stationary section 72 as a replacement component for the pod carrier 150. When the pod carrier 198 is used rather than the pod carrier 150, the funnel 152 is not used. The funnel 152 is removed from the aperture 86. The funnel and mixing attachment 200 is attached to the bottom end of the pod carrier 198 as further described below.

The shelf 220 and sealing surface 222 function substantially the same way as the shelves 192, 194 and sealing surfaces 188, 190 described above with reference to the pod carrier 150. In particular, when the lid 73 is moved to its closed position the ring member 98 can be rotated to its locked position to move the pod carrier 198 to an upward position. As the pod carrier 198 moves upward, the seal 96 is clamped between the top side of the outer rim 212 and the hot water discharge head to cause the seal to expand outward against the sealing surface 222. Because of the porous nature of the casing 182, a good seal cannot be formed against the casing 182 at the shelf 212. Thus, the seal 96 is used to seal against the sealing surface 212 and substantially prevent steam or hot water vapor from exiting from the pod receiving area 216 without passing through the pod 202. However, the seal 96 helps to clamp the pod 202 in the pod receiving area 216 such that the pod does not move or float in the event the pod receiving area 216 becomes substantially filled with water.

The pod carrier 198 includes a metal mesh screen 168, such as a screen having the plastic portion of the pod carrier over molded thereonto. However, in an alternate embodiment, the screen might not be metal, such as a molded plastic screen, and the screen could be attached to the frame of the pod carrier by any suitable means. The lower chamber 218 is located beneath the screen 168 and allows brewed coffee and nondairy creamer to mix therein before exiting a bottom outlet 224.

Referring also to FIG. 13, the main housing 226 of the pod carrier 198 includes mounting projections 228 on a lower exterior side and cam lugs 176 at a top side. The cam lugs 176 can work with the member 98 the same way that the cam lugs work on the pod carrier 150. The mounting projections 228 are provided to allow the funnel and mixing attachment 200 to be removably connected to the bottom end of the pod carrier 198. In an alternate embodiment, any suitable system for removably attaching the attachment 200 to the pod carrier 198 could be provided. The attachment 200 is screwed, twisted or rotated onto the bottom of the pod carrier 198. The two members 198, 200 could be connected by a caming connection. In one type of alternate embodiment, the funnel and mixing attachment could be formed integrally with the pod carrier rather than being removably connected.

The funnel and frothing attachment 200 comprises a main housing 230 and a mixing or frothing insert 232. The main housing 230 includes a top end with mounting apertures 234 and a bottom end with an outlet 236. The mounting apertures 234 are adapted to receive the mounting projections 228 therein to fixedly but removably attach the main housing 230 to the main housing 226. The mixing insert 232 comprises a plate having apertures 238 therethrough. The mixing insert 232 divides the main housing 230 into two chambers 240, 242. At least the first chamber 240 forms a frothing chamber. The mixing insert 232 is adapted to sit against interior sidewalls of the frame in the chamber. The mixing insert 232 is preferably removably located in the chamber for easier cleaning. When coffee and nondairy creamer exit from the lower chamber 218 from the bottom outlet 224 of the pod carrier 198, they enter the chamber 240 and contact the mixing insert 232. Although the brewed coffee and nondairy creamer mix in the lower chamber 218 of the pod carrier, the chamber 240 and mixing insert 232 allow the coffee and nondairy creamer to mix again, more thoroughly, in the chamber 240.

The coffee and nondairy creamer can flow through the apertures 238 into the chamber 242, with additional mixing or frothing occurring, and exit the outlet 236 as a mixed stream of coffee and creamer directly into a user's cup. Thus, the user does not need to manually mix the nondairy creamer with the brewed coffee. The mixing is done automatically in the chambers 218, 240 and 242; the three chambers each forming frothing chambers. The pod carrier 198 and funnel and mixing attachment 200 cause a slight time delay in the flow of liquid therethrough. This allows froth or foam generated from the mixing to at least slightly settle. Thus, because of this slight time delay, it may be preferred to have the temperature of the water entering the pod carrier 198 from the heater to be slightly higher in temperature than normal to compensate for heat lost during this time delay.

With the present invention a brewing apparatus pod carrier and mixing device can be provided which includes a pod receiving section open at a top side of the device, a first mixing section located below the pod receiving section and adapted to receive brewed liquid from a first outlet of the pod receiving section, and a second mixing section located below the first mixing section and adapted to receive the brewed liquid from a second outlet from the first mixing section. The device can include the two mixing sections arranged in series. The second outlet of the first mixing section is small relative to the first outlet of the pod receiving section such that the brewed liquid will partially mix in the first mixing section before passing through the second outlet to the second mixing section.

Figure 14:
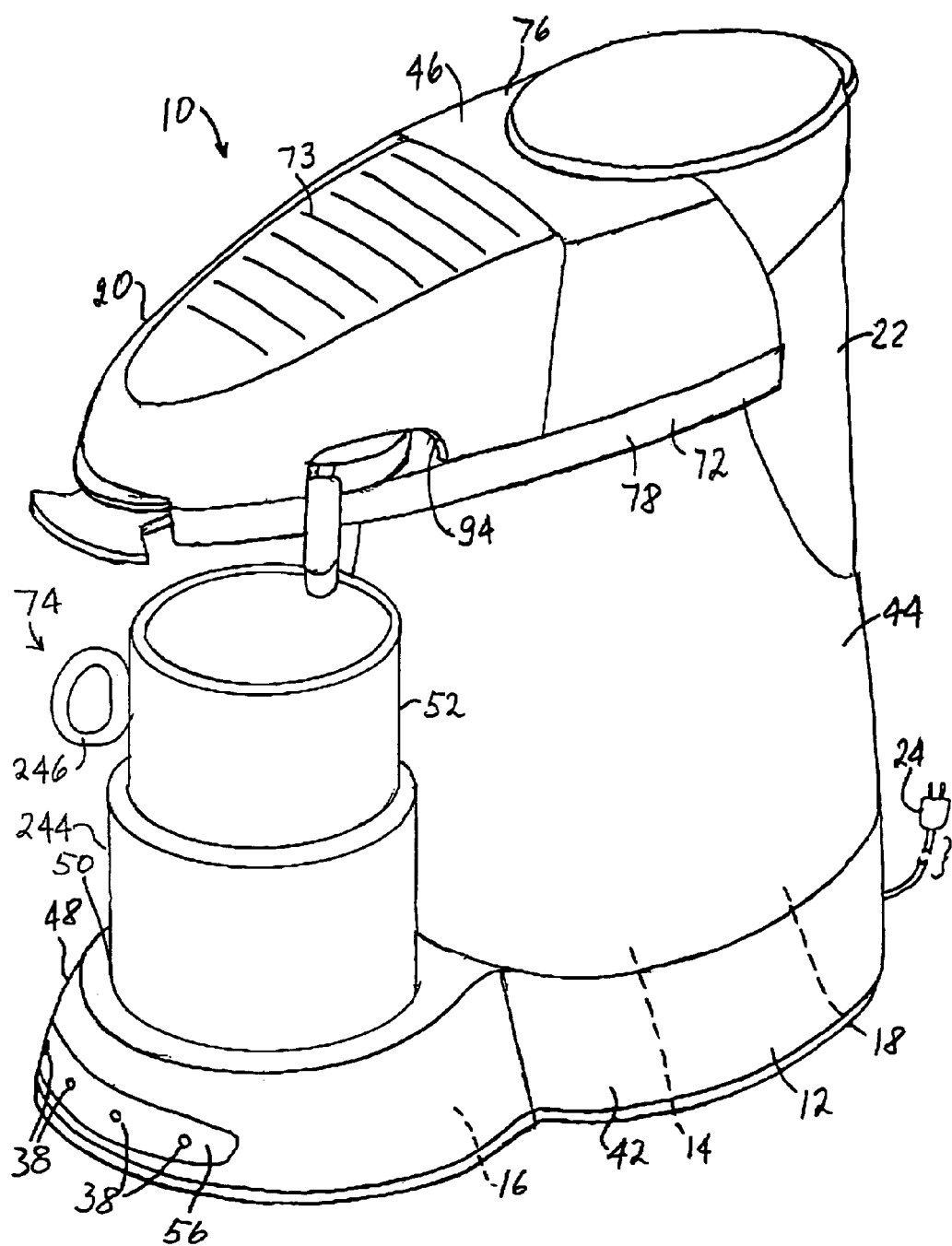
FIG. 14 is a perspective view of the coffeemaker shown in FIG. 1 with an optional elevation attachment for use with a smaller cup.
Figure 15:
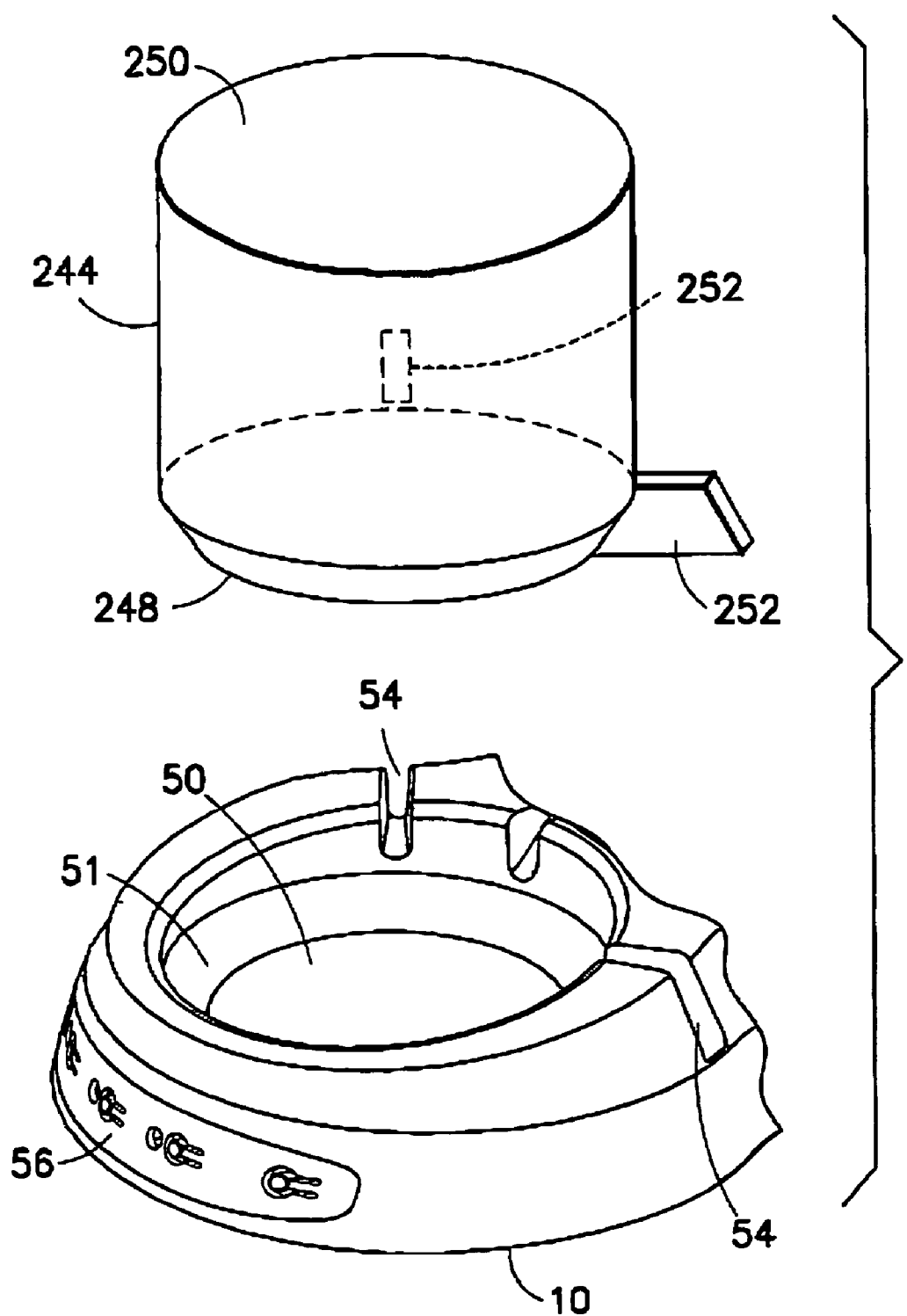
FIG. 15 is a partial, exploded perspective view of the optional elevation attachment shown in FIG. 14 and the support section of the housing of the coffeemaker

Referring now to FIGS. 14–15, another feature of the present invention will be described. In this embodiment, the coffeemaker 10 is provided with an additional, optional attachment 244 for accommodating the positioning of a smaller cup 246. The attachment 244 is a booster seat or elevated cup platform. The cup 52 shown in FIG. 1 is sized and shaped to receive at least twelve ounces of brewed coffee. Twelve ounces of brewed coffee can be generated by the coffeemaker 10 with the use of two of the coffee pods 180 and the pod carrier 150 having been positioned as shown in FIGS. 4 and 9. For brewing a smaller cup of coffee, such as seven ounces with the smaller coffee cup 246 shown in FIG. 14, if the smaller cup 246 were placed on the support surface 50 the distance between the funnel outlet 158 and the entrance to the smaller coffee cup 246 might result in coffee splashing out of the top of the coffee cup 246. The attachment 244 is provided to allow the smaller coffee cup 246 to be located at an elevated position relative to the support surface 50.

The elevation attachment 244 generally comprises a bottom end 248, a top surface 250, and stabilizing supports 252. In a preferred embodiment the attachment 244 has a general truncated cone shape with the bottom end 248 being larger than the top surface 250. A side wall connects the top and bottom sides. In a preferred embodiment the side wall is about two or three or four inches high. However, any suitable height could be provided. The attachment 244 is preferably a one piece member made of molded plastic or polymer material. The general cone shape provides stability to the attachment on the support surface 50. However, any suitable shape can be provided. The bottom end 248 is sized and shaped to fit in the recess 51 and against the support surface 50. The bottom side is adapted to be vertically lowered into the recess. The stabilizing supports 252 are sized and shaped to be located in the slots 54. The stabilizing supports 252 help to stabilize the elevation attachment 244 and prevent it from pivoting or rotating while connected in the recess 51. The top surface 250 is sized and shaped to support the bottom surface of the smaller cup 246 thereon.

As shown in FIG. 14, when the elevation attachment 244 is connected to the forward extending section 48 of the base section 42, the elevation attachment 244 can allow a user to place the smaller size cup 246 on the attachment 244 at an elevated position closer to the outlet 158 of the discharge, funnel 152 (see FIG. 11). When brewing coffee for the smaller size cup 246, the pod carrier 150 would be orientated as shown in FIG. 11 to receive only one pod in its top receiving area. The height of the elevation attachment is preferably about three to four inches or more. However, any suitable height could be provided. The elevation attachment could also have a variable or reconfigurable height, or variable connection location to the housing of the coffeemaker. The housing and the booster seat are adapted to alternatively support the first larger cup 52 without use of the booster seat or the second smaller cup 246 with the use of the booster seat at about the same distance from the brewed coffee outlet from the exit funnel. One of the features of the present invention is the reduced cost of the attachment 244 relative to the more complicated prior art devices. The reduced cost is possible because the attachment is merely a one-piece member, such as a molded member, and does not need any complicated connection to the frame of the coffeemaker. In addition, the attachment 244 is relatively easy to clean because of its simple structure, and can even be placed in an automatic dishwasher.

In an alternate embodiment the stabilizing supports 252 might not be provided. In this alternate embodiment, the bottom side forms a sole connection area with the brewing apparatus by merely being place on top of the brewed liquid container support surface 50 without any additional attachments.

Referring back to FIG. 1, the coffeemaker 10 comprises four of the control switches 38. A first one of the control switches 38 is actuated by a user when using a single pod 180 and the elevation attachment 244 for making a small cup of coffee. The pod carrier 150 would be positioned as shown in FIG. 11. When this first control switch is actuated, the controller 16 will control the heater 14 and pump 18 to supply about seven ounces of hot water through the pod carrier and out the outlet 158. Based upon the speed of the pump 18 and the duration which the pump is pumping, the controller 16 can precisely measure the quantity of hot water which is being dispensed. A second one of the control switches 38 is actuated by a user when using two of the pods 180 for making a larger cup of coffee, such as the twelve ounce cup 52 shown in FIG. 1. The pod carrier 150 would be positioned as shown in FIGS. 4 and 9. When this second control switch is actuated, the controller 16 will control the heater 14 and pump 18 to supply about twelve ounces of hot water through the pod carrier and out the outlet 158. A third one of the control switches 38 is actuated by the user when using the pod 202, pod carrier 198 and attachment 200 shown in FIG. 12 for making coffee having nondairy creamer. When this third control switch is actuated, the controller 16 will control the heater and pump to supply about seven ounces of hot water through the pod carrier and out the outlet 236. The speed of the pump 18 when brewing with the pod 202 might be slower than the speed of the pump when the first or second control switches are actuated to allow the water to be heated to a higher temperature because the water will take longer to pass through the pod 202 then through one or two of the pods 180. A fourth one of the control switches 38 is actuated by the user to perform an override or reset of the controller 16. For example, if the user presses a wrong one of the control switches, the user can press the fourth control switch to interrupt a brewing cycle. In alternate embodiments, any suitable type of user interactive control could be provided.

The coffeemaker can operate in one of three brewing modes with the actuation of one of the first three user actuated switches 38 noted above. In particular, the actuation of the first switch can cause the coffeemaker to dispense a first quantity of water at a first temperature. The actuation of the second switch can cause the coffeemaker to dispense a second quantity of water at a second temperature. The second temperature could be the same as the first temperature or could be hotter or cooler than the first temperature. The actuation of the third switch can cause the coffeemaker to dispense a third quantity of water at a third temperature. The third quantity of water is preferably about the same as the first quantity of water. However, the third quantity of water could be more or less than the first quantity of water. The third temperature is preferably hotter than the first and second temperatures. However, the third temperature could be the same as or cooler than the first or second temperatures.

One of the features of the present invention is the ability to use another mode of brewing. A user can load the pod carrier 150 with two of the pods 180. However, rather than pressing the user actuated switch 38 for twelve ounces of water, the user can actuate the switch 38 for seven ounces of water. This will result in an extra strong cup of seven ounces of coffee being brewed. Another mode of operation could comprise the user loading the pod carrier 150 with two of the pods 180. However, rather than pressing the user actuated switch 38 for seven or twelve ounces of water, the user can actuate the switch 38 for the creamy pod. This could result in a hotter and stronger cup of coffee, but perhaps more than seven ounces.

The user could also load the pod carrier with two different types of the pods 180; having different coffee grounds in each pod to produce a unique mixture or coffee blend. For example, the user could load one pod flavored with vanilla and a second pod flavored with hazelnut to produce a user configured blend; configured based upon user selection of different types of coffee pods.

Although the present invention was described above comprising a removable coffee pod carrier and a reversible coffee pod carrier, features of the present invention could be used with a non-removable coffee pod carrier and/or a coffee pod carrier which is not intended to be reversible or re-orientatable. In another alternate embodiment, the coffee pod carrier might have more or less than two coffee pod receiving areas, such as only one coffee pod receiving area as shown in FIG. 12. Rather than a removable funnel, such as the funnel 152, the funnel could be integrally formed with the housing of the coffeemaker or the housing of the coffee pod carrier. Although specific types of coffee pods 180, 202 have been described above, features of the present invention could be adapted for use with any suitable type of coffee pods, or pods carrying brewable material, such as tea leaves. In another alternate embodiment, any suitable type of movable lid for the coffeemaker could be provided. In one type of alternate embodiment, the seal 96 could form a seal with the top side of the pod carrier, or the seal could form a seal with the outer perimeter side of the pod carrier. The seal could be located on the lid housing rather than on the hot water discharge head. In one type of alternate embodiment, the coffeemaker could comprise an electromechanical latch, such as a solenoid to prevent the ring 98 from being moved away from the locked position during a brew cycle and thereby prevent the lid from being moved to an open position during the brew cycle. In one type of alternate embodiment, the temperature of the heater could be adjusted as well as the speed of the pump. Alternatively, the speed of the pump could be constant and the temperature of the heater could merely be adjusted.

With the present invention, a brewing apparatus can be provided comprising a system for varying water temperature of water exiting the heater. The system can comprise a controller coupled to sensors, wherein power when the hot water heater is ON is supplied as a substantially fixed non-varying power, and wherein the controller is adapted to provide hot water from the heater at either a first temperature or a second higher temperature based upon speed of the pump without varying power supply to the heater. A brewing apparatus can be provided comprising a user input section connected to the controller. The user input section can be adapted to allowed a user to select one of at least three brewing modes comprising a first mode having a first quantity of water delivered by the pump and the heater at a first temperature, a second mode having a second quantity of water delivered by the pump and the heater at a second temperature, and a third mode having a third quantity of water delivered by the pump and the heater at a third temperature. The first and second temperatures can be equal, and the third temperature can be the same as or different from the first and second temperatures.

Figure 18:
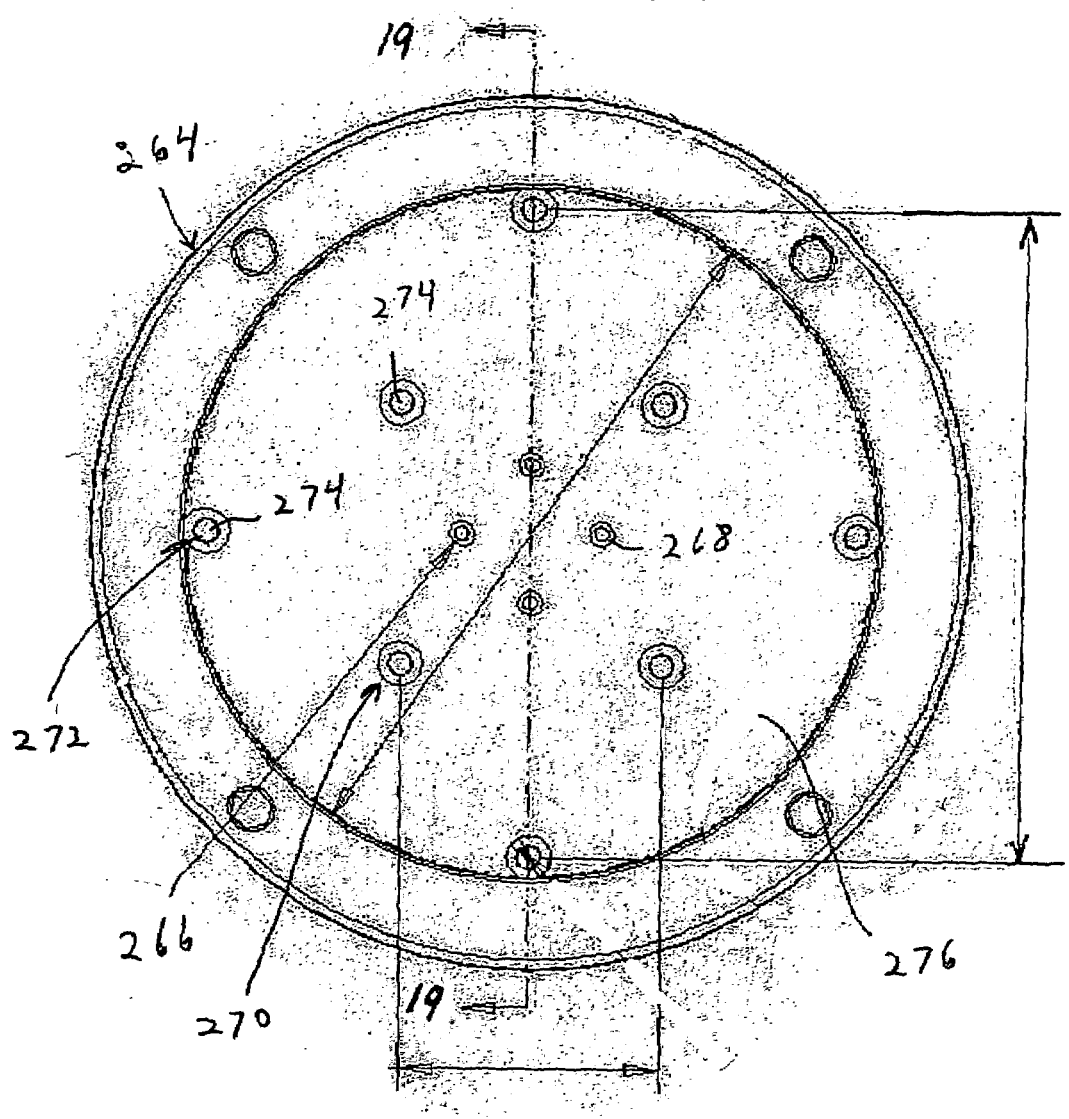
FIG. 18 is a bottom plan view of a bottom plate of one embodiment of the hot water discharge head.
Figure 19:
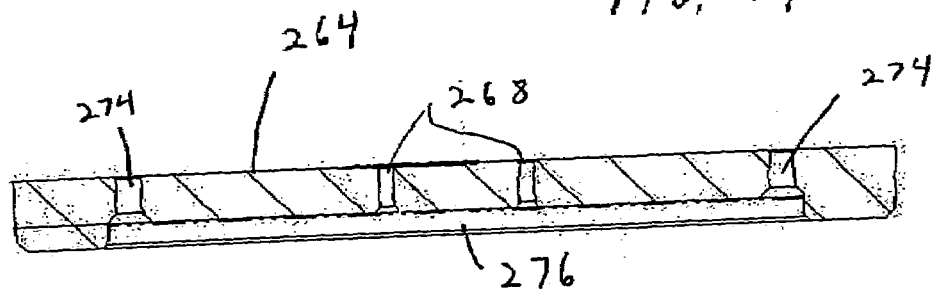
FIG. 19 is a cross sectional view of the plate shown in FIG. 18 taken along line 19—19.

Referring now to FIGS. 18 and 19, there is shown one embodiment of a bottom plate 264 of the hot water discharge head 66. The bottom plate 264 generally comprises three sets of water discharge holes. A first set 266 of the holes comprises a first center array of smaller holes 268. In the embodiment shown, the first set 266 of smaller holes 268 comprise four of the smaller holes arranged in a general box or diamond shape configuration. However, in alternate embodiments, any suitable number of smaller holes and any suitable pattern could be provided.

The second set 270 of the holes and to the third set 272 of the holes form a second surrounding array of larger holes 274. In the embodiment shown, the second set 270 of larger holes 274 comprise four of the larger holes arranged in a general box or diamond shape configuration similar to the pattern of the first set 266 of smaller holes. However, the second set 270 of larger holes is axially rotated about 45 degrees relative to the first set 266 of smaller holes. The third set 272 of larger holes to 274 comprise four of the larger holes arranged in a general box or diamond shape configuration similar to the pattern of the first set 266 of smaller holes and aligned with the first set of smaller holes. The second set 270 and a third set 272 form concentric rings of holes around the first set 266.

In the embodiment shown, the larger holes 274 are at least about 50 percent larger than the smaller holes 268. In a preferred embodiment, the larger holes 274 are about 75 percent larger than the smaller holes 268. With the present invention hot water introduced into the plenum of the hot water discharge head 66 is allowed to exit the plenum out the bottom outlet holes 268, 274. More of the hot water from the plenum exits the outer holes than the center holes for a total wetting of the coffee pod located beneath the bottom plate 264 and a substantially even removal of coffee from the coffee grounds in the pod. In the embodiment shown, the bottom plate 264 includes a recessed area 276 which is adapted to receive a portion of the coffee pod if necessary. However, the recessed area 276 preferably provides an area to allow hot water to migrate, at least partially, over a top surface of the coffee pod before entering the coffee pod. This also increase entire wetting of the coffee grounds inside the coffee pod and more even removal of coffee from the coffee grounds.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A brewing apparatus comprising:
   a housing having a movable lid and a brewing area under the lid;
   a hot water heater connected to the housing;
   a water pump connected to the hot water heater;
   a controller coupled to the hot water heater and the pump;
   a switch connected to the housing and adapted to be actuated by a user movable member, said user movable member being connected to said movable lid, said switch being placed in an on state in response to said user movable member locking said lid in a closed position; and
   wherein the switch is coupled to the controller, and wherein the controller is adapted to discontinue heating by the heater when the switch is moved to a deactuated position.

2. A brewing apparatus as in claim 1 wherein the user movable member comprises a locking ring member which is rotatably connected to the movable lid.

3. A brewing apparatus as in claim 1 wherein the user movable member comprises a combined locking and camming ring member which is adapted to lock the lid in a closed position and cam a pod carrier into a brewing position.

4. A brewing apparatus as in claim 3 wherein an assembly is connected to the lid comprising a hot water discharge head connected to the hot water heater, and the combined locking and camming ring member rotatably connected on the hot water discharge head.

5. A brewing apparatus as in claim 1 wherein the user movable member comprises a camming member movably connected to the lid for camming a pod carrier of the brewing apparatus in an upward direction towards a hot water discharge head of the brewing apparatus.

6. A brewing apparatus as in claim 1 wherein the controller is adapted to continue pumping of water through the hot water heater after the controller has discontinued heating by the heater.

7. A brewing apparatus as in claim 6 wherein the controller is adapted to continue pumping of water through the hot water heater for a predetermined period of time after the controller has discontinued heating by the heater.

8. A brewing apparatus 1 as in claim 6 further comprising a temperature sensor connected to the hot water heater, wherein the temperature sensor is coupled to the controller, and wherein the controller is adapted to discontinue pumping of water by the pump when the temperature sensor senses a predetermined temperature of the hot water heater.

9. A brewing apparatus comprising:
   a housing having a movable lid and a brewing area under the lid;
   a hot water heater connected to the housing;
   a water pump connected to the hot water heater;
   a controller coupled to the hot water heater and the pump; and
   a lock for retaining the lid in a closed position, the lock comprising an electromechanical member coupled to the controller,
   wherein the controller is adapted to prevent the lock from being opened until an occurrence of a predetermined event.

10. A brewing apparatus as in claim 9 wherein the lock comprises a locking ring member which is rotatably connected to the movable lid.

11. A brewing apparatus as in claim 9 wherein the lock comprises a combined locking and camming ring member.

12. A brewing apparatus as in claim 11 wherein an assembly is connected to the lid comprising a hot water discharge head connected to the hot water heater, and the combined locking and camming ring member rotatably connected to the hot water discharge head.

13. A brewing apparatus as in claim 9 wherein the lock comprises a camming member movably connected to the lid for camming a pod carrier of the brewing apparatus in an upward direction towards a hot water discharge head of the brewing apparatus.

14. A brewing apparatus as in claim 9 wherein the electromechanical member comprises a solenoid, wherein the lock comprises a latch adapted to lock the lid in a closed position, wherein the solenoid is adapted to retain the latch in a locked position, and wherein the brewing apparatus further comprises a switch connected to the controller for signaling when the latch has been moved to the locked position.

* * * * *